US009490920B2

(12) United States Patent
Partee

(10) Patent No.: US 9,490,920 B2
(45) Date of Patent: Nov. 8, 2016

(54) TEST STATION FOR TESTING WIRELESS ELECTRONIC DEVICES

(71) Applicant: ATC Logistics & Electronics, Inc., Fort Worth, TX (US)

(72) Inventor: Jimmie Paul Partee, Double Oak, TX (US)

(73) Assignee: ATC Logistics & Electronics, Inc., Fort Worth, TX (US)

(*) Notice: Subject to any disclaimer, the term of this patent is extended or adjusted under 35 U.S.C. 154(b) by 110 days.

(21) Appl. No.: 14/143,094

(22) Filed: Dec. 30, 2013

(65) Prior Publication Data
US 2014/0187172 A1 Jul. 3, 2014

Related U.S. Application Data

(63) Continuation-in-part of application No. 13/664,872, filed on Oct. 31, 2012, which is a continuation-in-part of application No. 13/277,079, filed on Oct. 19, 2011.

(51) Int. Cl.
*H04B 10/00* (2013.01)
*H04B 17/00* (2015.01)
*H04L 12/26* (2006.01)
*H04H 20/12* (2008.01)

(52) U.S. Cl.
CPC .............. *H04B 17/00* (2013.01); *H04H 20/12* (2013.01); *H04L 43/045* (2013.01); *H04L 43/50* (2013.01)

(58) Field of Classification Search
CPC ..................... H04B 10/073; H04B 10/0731
USPC ...................................... 455/67.12
See application file for complete search history.

(56) References Cited

U.S. PATENT DOCUMENTS

| | | | |
|---|---|---|---|
| 5,488,371 A * | 1/1996 | Targove | 342/1 |
| 6,252,626 B1 | 6/2001 | Buckley et al. | |
| 6,268,740 B1 * | 7/2001 | Iida | G01R 31/2868 324/750.19 |
| 6,525,657 B1 * | 2/2003 | Wojcik | 340/514 |
| 6,622,307 B1 | 9/2003 | Ho | |
| 9,052,348 B2 * | 6/2015 | Srikumar | G01R 31/01 |
| 2003/0057984 A1 * | 3/2003 | Akram | G01R 31/2862 324/750.03 |
| 2003/0101391 A1 | 5/2003 | Man et al. | |
| 2003/0197732 A1 | 10/2003 | Gupta | |
| 2005/0053008 A1 * | 3/2005 | Griesing et al. | 370/241 |
| 2007/0192814 A1 | 8/2007 | Southerland et al. | |
| 2008/0011110 A1 * | 1/2008 | Costonis | 73/866 |
| 2008/0133974 A1 | 6/2008 | Kogan et al. | |
| 2008/0168520 A1 | 7/2008 | Vanderhoff et al. | |
| 2009/0089854 A1 | 4/2009 | Le et al. | |
| 2011/0145645 A1 * | 6/2011 | Volkerink | G01R 31/31903 714/35 |
| 2012/0052816 A1 * | 3/2012 | Chang et al. | 455/67.12 |
| 2012/0221277 A1 * | 8/2012 | Gregg et al. | 702/106 |

OTHER PUBLICATIONS

International Search Report and Written Opinion date mailed Jan. 22, 2013; PCT International: Application No. PCT/US2012/061031.

* cited by examiner

*Primary Examiner* — Wen Huang
(74) *Attorney, Agent, or Firm* — McGuireWoods LLP

(57) ABSTRACT

A system, method, and testing station for testing wireless network devices. The testing station includes a control system configured to control parallel testing of the wireless network devices. The testing station includes one or more computing devices in communication with the control system. The one or more computing devices are configured to perform testing of each of the wireless network devices in response to commands from the control system. The testing station includes a number of testing chambers configured to isolate the wireless network devices from outside radio frequency signals.

21 Claims, 29 Drawing Sheets

FROM FIG. 9A

STB #5

| Serial Number | | IDLE |
| Model ID | | Boot-up Test |
| IP Address | | Internal Tests |
| H/W Rev | | Video Tests |
| MAC Address (eth) | | Audio Tests |
| MAC Address (HPNA) | | Remote Control Tests |
| HDD Info | | Ethernet Tests |
| Boot Flash Info | | HPNA Tests |
| | | Hard Drive/Flash Tests |
| | | LED and Buttons Tests |

STB #6

| Serial Number | ddd | ACTION REQUIRED |
| Model ID | My Model ID | ✓ Boot-up Test |
| IP Address | My IP | ✓ Internal Tests |
| H/W Rev | My HW Rev | ✓ Video Tests |
| MAC Address (eth) | My Eth MAC Add | ✓ Audio Tests |
| MAC Address (HPNA) | My HPNAMACAdd | ✓ Remote Control Tests |
| HDD Info | My HDD Info | ✓ Ethernet Tests |
| Boot Flash Info | My Boot Flash Info | ✓ HPNA Tests |
| | | ⇨ Hard Drive/Flash Tests |
| | | LED and Buttons Tests |

STB #7

| Serial Number | eee | RUNNING |
| Model ID | My Model ID | ✓ Boot-up Test |
| IP Address | My IP | ✓ Internal Tests |
| H/W Rev | My HW Rev | ✓ Video Tests |
| MAC Address (eth) | My Eth MAC Add | ✓ Audio Tests |
| MAC Address (HPNA) | My HPNAMACAdd | ⇨ Remote Control Tests |
| HDD Info | My HDD Info | Ethernet Tests |
| Boot Flash Info | My Boot Flash Info | HPNA Tests |
| | | Hard Drive/Flash Tests |
| | | LED and Buttons Tests |

STB #8

| Serial Number | | IDLE |
| Model ID | | Boot-up Test |
| IP Address | | Internal Tests |
| H/W Rev | | Video Tests |
| MAC Address (eth) | | Audio Tests |
| MAC Address (HPNA) | | Remote Control Tests |
| HDD Info | | Ethernet Tests |
| Boot Flash Info | | HPNA Tests |
| | | Hard Drive/Flash Tests |
| | | LED and Buttons Tests |

STB #7

COMPOSITE MATRIX

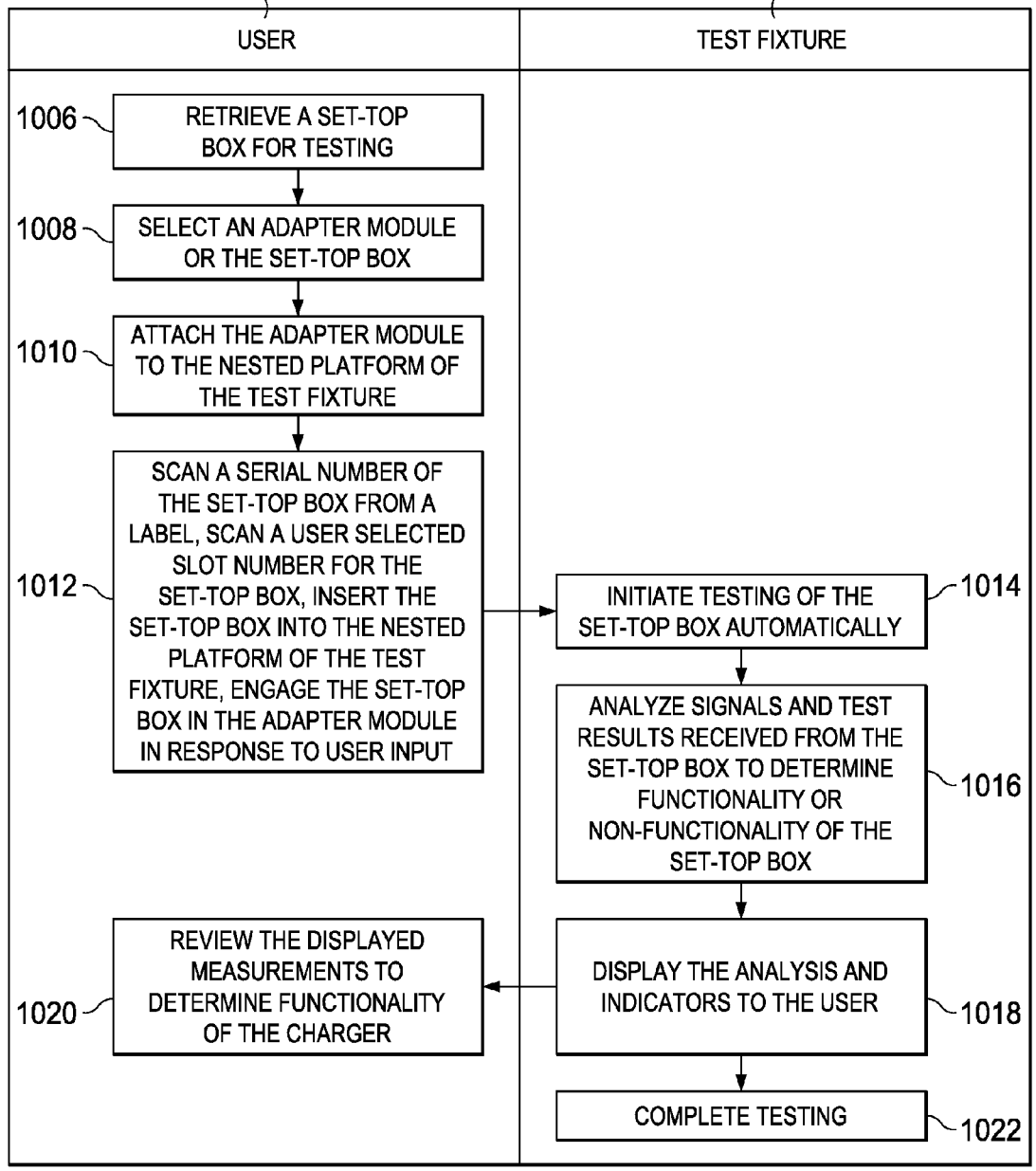

TEST STATION FOR TESTING WIRELESS ELECTRONIC DEVICES

CROSS-REFERENCE TO RELATED APPLICATIONS

This patent application is a continuation-in-part of U.S. patent application Ser. No. 13/664,872 entitled "TEST FIXTURE AND METHOD FOR SECURING AND TESTING NETWORK DEVICES" which is a continuation-in-part of U.S. patent application Ser. No. 13/277,079 entitled "SYSTEM AND METHOD FOR SECURING AND TESTING SET-TOP BOXES" and is a co-pending application of U.S. patent application Ser. No. 12/940,331, filed Nov. 5, 2010 entitled "SYSTEM AND METHOD FOR REMOVING CUSTOMER PERSONAL INFORMATION FROM AN ELECTRONIC DEVICE", U.S. patent application Ser. No. 12/940,346, filed Nov. 5, 2010 "SYSTEM AND METHOD FOR AUDITING REMOVAL OF CUSTOMER PERSONAL INFORMATION ON ELECTRONIC DEVICES", and U.S. patent application Ser. No. 12/940,299, filed Nov. 5, 2010, entitled "SYSTEM AND METHOD FOR TRACKING CUSTOMER PERSONAL INFORMATION IN A WAREHOUSE MANAGEMENT SYSTEM" each of which were previously filed and the teachings and disclosures of which are hereby incorporated in their entireties by reference thereto.

BACKGROUND

The consumption of and development of media communications has grown nearly exponentially in recent years. The growth is fueled by larger networks with more reliable protocols and better communications hardware available to both service providers and consumers. In particular, new set-top boxes, gaming devices, televisions, and network devices are constantly being released.

Network devices are required to go through various forms of testing to ensure compliance with communications and formatting standards, and technical requirements set by standard setting organizations (SSOs), governments, industry groups, companies, service providers, or other applicable parties. Performing tests, evaluation and analysis for a single network device, such as a residential gateway or modems, may be time consuming and difficult and is complicated when performing tests for multiple network devices.

SUMMARY

One embodiment provides a system, method, and testing station for testing wireless network devices. The testing station may include a control system configured to control parallel testing of the wireless network devices. The testing station may include one or more computing devices in communication with the control system. The one or more computing devices may be configured to perform testing of each of the wireless network devices in response to commands from the control system. The testing station may include a number of testing chambers configured to isolate the wireless network devices from outside radio frequency signals.

Another embodiment provides a method for testing a number of wireless network devices. Each of the wireless network devices may be inserted in one of a number of test chambers of a test fixture. The number of test chambers may be configured to block radio frequency signals from entering or leaving the number of test chambers. Each of the wireless network devices is engaged in a test slot associated with the number of test chambers. The number of wireless network devices are automatically tested in parallel in response to user input. Test results for each of the number of wireless network devices are measured. The test results for each of the number of wireless network devices are displayed to a user.

Yet another embodiment provides a testing station for testing wireless network devices. The testing station may include a control system configured to control parallel testing of the wireless network devices. The testing station may include one or more computing devices in communication with the control system. The one or more computing devices may be configured to perform testing of each of the wireless network devices in response to commands from the control system. The testing station may include a number of testing chambers configured to isolate the wireless network devices from outside radio frequency signals. Each of the number of testing chambers include a slidable cover for inserting and removing each of the wireless network devices.

BRIEF DESCRIPTION OF THE DRAWINGS

Illustrative embodiments of the present invention are described in detail below with reference to the attached drawing figures, which are incorporated by reference herein and wherein:

FIGS. 9A and 9B are a pictorial representation of graphical user interface in accordance with an illustrative embodiment;

FIG. 10 is a flowchart of a process for testing a set-top box in accordance with an illustrative embodiment;

DETAILED DESCRIPTION OF THE DRAWINGS

Figure 1:
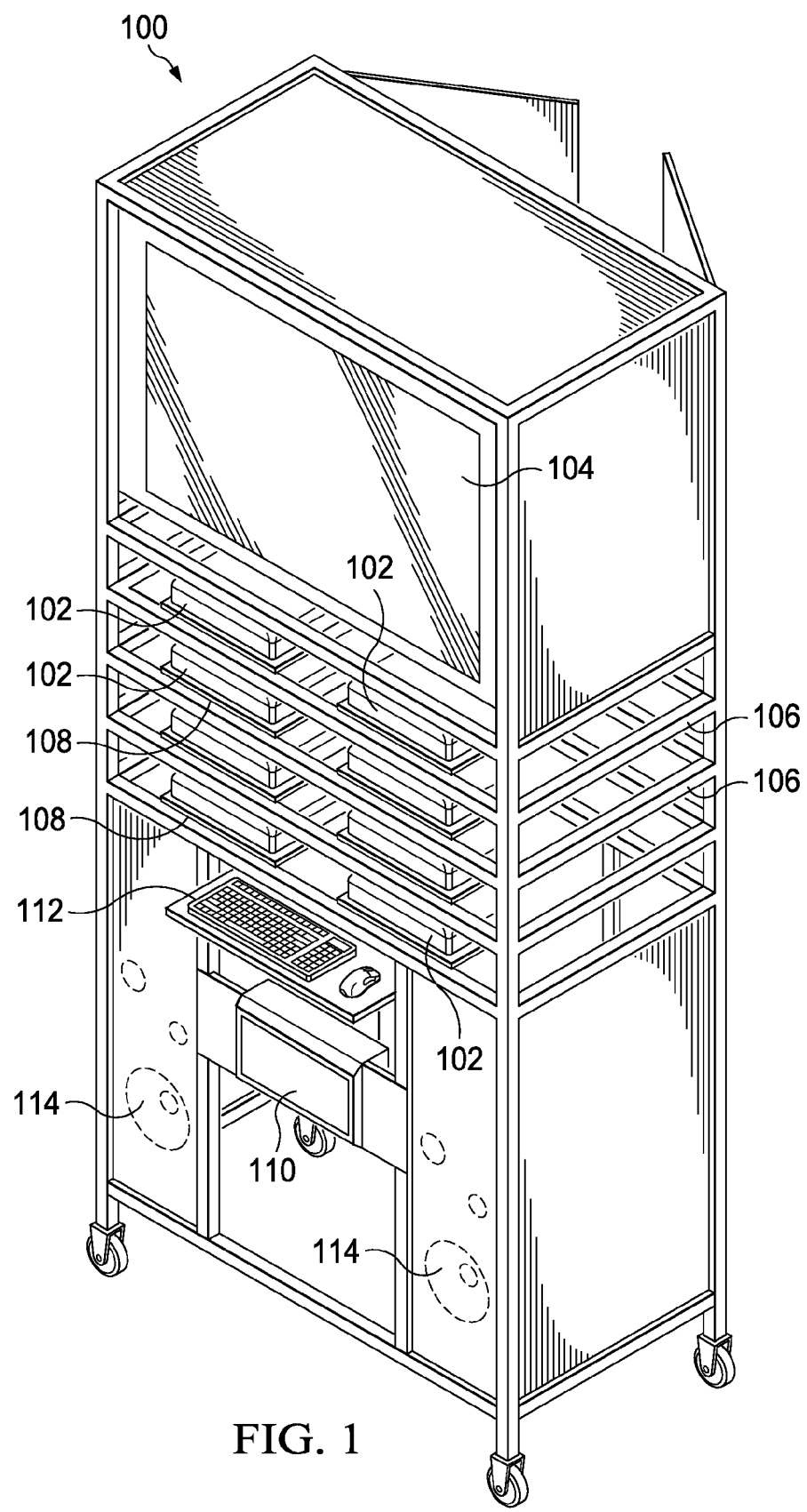
FIG. 1 is a pictorial representation of a test fixture in accordance with an illustrative embodiment.

Illustrative embodiments provide a test fixture, station, system, and method for testing residential gateways, modems, IPTV devices, and other network devices. The residential gateway may be utilized or referred to herein as a specific example of one of the network devices being tested. The residential gateway is a home networking device used as a gateway to connect multiple devices in a home, business, or organization to the Internet or other network, such as a wide area network (WAN). The residential gateway may define or include components and features of a DSL or cable modem, a firewall, a router, a network switch, and a wireless access point. In another embodiment, the test fixture may be utilized to test any of these distinct network devices. Network devices may include media, computing, networks or communications devices including gaming consoles, digital video recorders (DVRs), personal video recorders, cable boxes, and Internet Protocol television (IPTV) devices. The network devices may represent user issued or commercial devices utilized by communication service providers. The network devices may or may not be stand-alone devices or network/Internet capable devices.

In one embodiment, a test fixture is a testing station that may be utilized to secure the residential gateway while testing and measuring the characteristics and performance of the residential gateway for performing the required features, processing, and formatting required of the residential gateway. The test fixture may be enabled to receive multiple residential gateways in nested platforms. For example, the test fixture may include eight nested platforms for receiving residential gateways. In one embodiment, the test fixture may include one or more adapter modules and interfaces for powering and communicating with the residential gateways.

The test fixture may also include a user interface for an operator, test engineer, or other individual to interface with the test fixture. For example, the user interface may include peripherals, such as a monitor, keyboard, mouse and scanner.

The test fixture may automatically perform pre-established tests, processes, and software updates for testing the residential gateway and ensuring that all customer private information (CPI) has been removed. The test fixture may also be utilized for performing testing for residential gateways that operate wirelessly or include wireless functionality. The test fixture may include computing and communications components, including, but not limited to processors, logic, memories, communication ports and interfaces and databases for storing programs, applications, and instructions utilized to perform the automated testing. In another embodiment, a user may utilize the user interface to perform manual testing as needed.

The testing results may be displayed to the test fixture or displayed or communicated to one or more external devices. In one embodiment, a display is partitioned to display results for each of the residential gateways for purposes of efficiency. The illustrative embodiments may be utilized for returned, refurbished, repaired, or new network devices to efficiently perform tests and analysis. Automated testing removes operator subjectivity, improves quality control, and makes testing faster and less expensive.

The residential gateways may be configured to perform communications utilizing any number of wired and wireless communications standards, protocols, or formats along with associated hardware, software, and firmware including coaxial cable, twisted pair, digital subscriber line (DSL), fiberoptics, T-1, WiMAX, WiFi, wideband code division multiple access (W-CDMA), CDMA, global system for mobile communications (GSM), general packet radio service (GPRS), enhanced GPRS (EGPRS), high-speed downlink packet access (HSDPA), evolution-data optimized (EVDO), Bluetooth, GPS, WiMAX, personal communications service, and other developing forms of digital and analog communications. The test fixture may also be utilized to perform radio frequency (RF) testing if the residential gateway is enabled for wireless communications including testing a remote control associated with the residential gateway.

In particular, the test fixture may allow different model types of residential gateways to be repeatably tested. For example, the test fixture may be configured to test multiple residential gateways for any model of a particular manufacturer. After the test fixture is initially configured, multiple residential gateways of a manufacturer having the same or different models may be tested utilizing the test fixture. The test fixture may indicate the positioning of the respective components utilized during testing to reconfigure the test fixture at a later time. The test fixture may allow a user to quickly insert the residential gateways into the nested platform. As a result, multiple tests for residential gateways may be carried out efficiently and consistently and with a high degree of accuracy for residential gateways reducing costs, time, and difficulty.

The test fixture may be utilized by governmental entities, SSOs, companies, research and development groups, industry regulators, and others that build, test, repair, or refurbish residential gateways. The test fixture may be configured without any special tools or expensive training. For example, set screws may be utilized to position and secure the components of the test fixture. The test fixture provides a universal test stand, platform, or fixture that may be shared or utilized for numerous residential gateways, reducing the testing equipment and lab costs that may be required to test each residential gateway. The test fixture may allow testing for a residential gateway to be repeated by multiple parties (original equipment manufacturers (OEMs), service providers, government entities). In particular, being able to consistently reproduce media testing may be important when important findings, such as compliance failures or communications failures are measured or tested. The media testing may include formatting and communications to and from the residential gateway.

The test fixture allows for the automation of automated tests of internal and external components (e.g. memories, ports, interfaces, etc.) as well as video and audio tests. In one embodiment, the tests may be run in parallel to reduce the time required for each of the tests. The software and testing routines may be updated as required for performing the testing. The test results may be saved and post-test parametric and trend analysis may be performed and reported to any number of services providers, manufacturers, or other interested parties.

Figure 2:
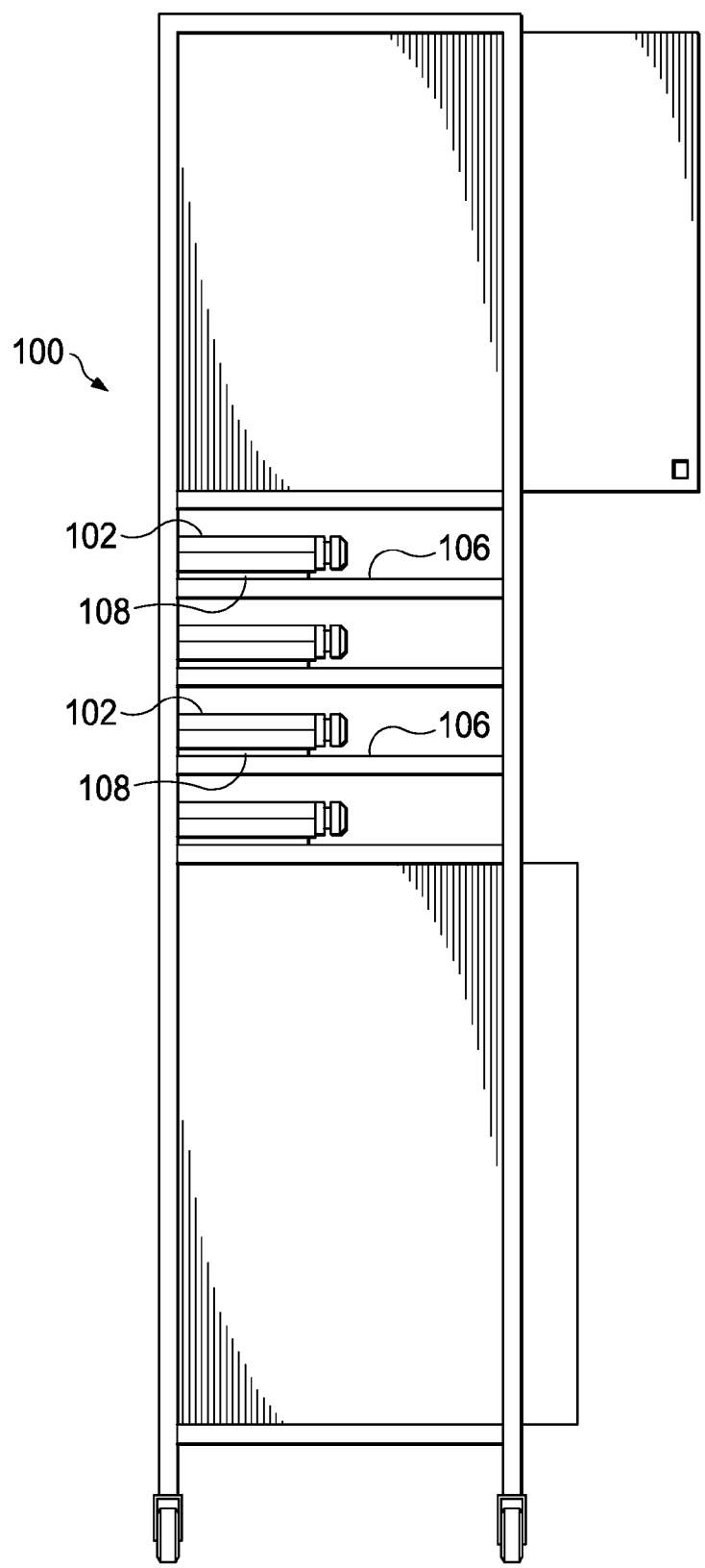
FIG. 2 is a pictorial representation of a side view of the test fixture of FIG. 1 in accordance with an illustrative embodiment.
Figure 3:
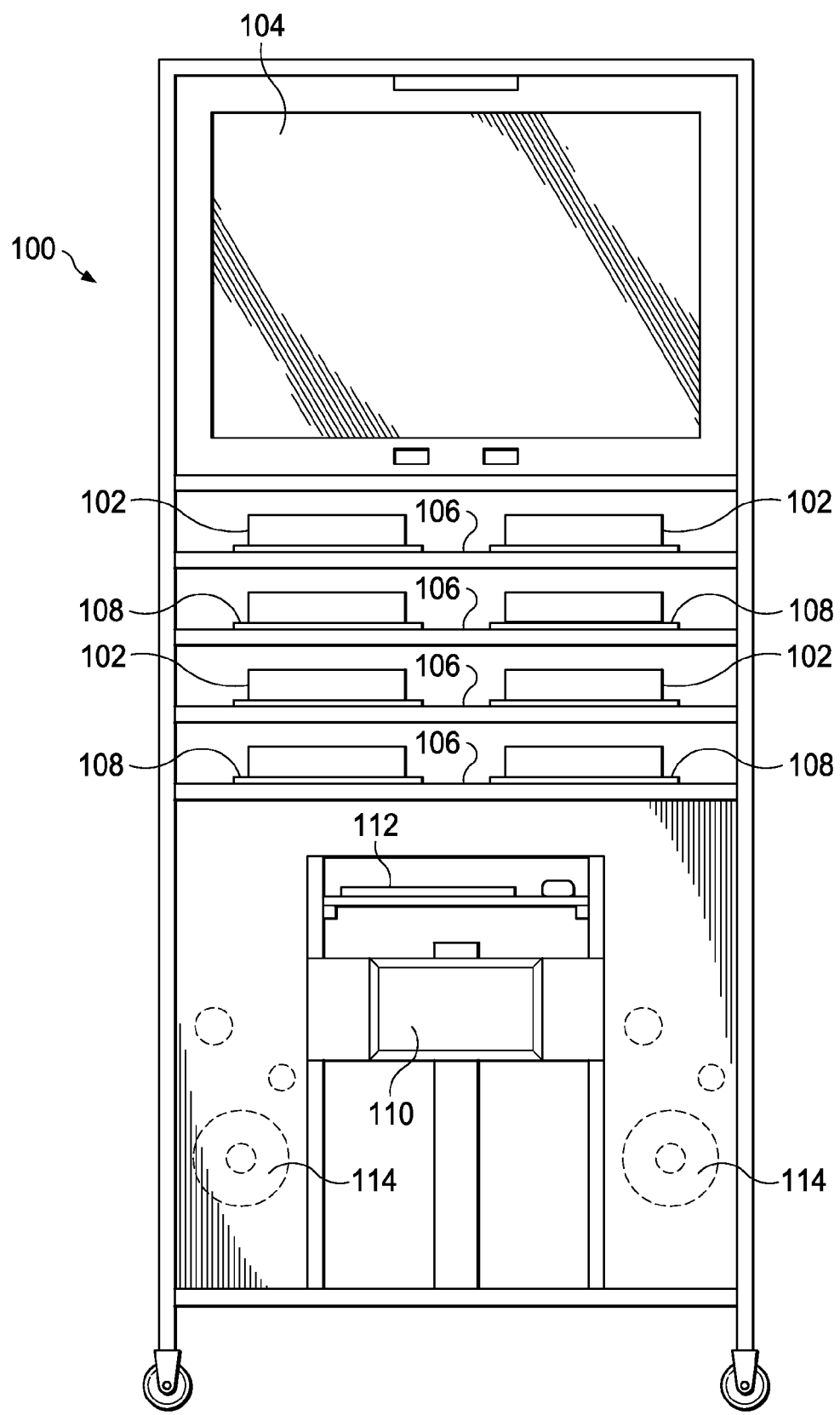
FIG. 3 is a pictorial representation of a front view of the test fixture of FIG. 1 in accordance with an illustrative embodiment.

FIGS. 1-3 are a pictorial representation of a test fixture 100 in accordance with an illustrative embodiment. The test fixture 100 may be a system, stand, platform, bench, cabinet, or tool that is configured to enable a user to perform testing and formatting analysis for a residential gateway. In one embodiment, the test fixture 100 is shown as a portable cabinet that may be moved to a location for testing. Functional testing of one or more residential gateways 102 may include measuring wireless signal strength and quality including electrical characteristics (voltage, current, response time, propagation delay, jitter, etc.) of the video and audio signals and comparing those signals against applicable industry standards. The communications, encryption, and formatting capabilities of the one or more residential gateways 102 may be tested. For example, the data signals may be analyzed for degradation from distortion, frequency shift, DC offset, etc.

Any number of signal measurements tools may measure the response of the residential gateways 102. In addition, safety components, such as switches, breakers, and other circuits may be utilized to ensure that testing is terminated in response to hardware failures, overheating, and other potentially damaging or dangerous conditions.

In one embodiment, the test fixture 100 may include a display 104 (not shown), racks 106, nested platforms 108, computing devices 110, keyboard 112, and speakers 114. The display 104 may be one or more televisions, projectors, computers, monitors, tablets, wireless devices, OLED screens, or any number of other display components. In one embodiment, the display 104 is a flat screen television that is set on or mounted to the test fixture 100. The display 104 may be utilized to communicate testing patterns, media content, or a sample signal to the user for user evaluation or verification.

The test fixture 100 may provide a framework that may be utilized to customize, secure, and connect various components for performing the testing and other methods herein described. In one embodiment, the racks 106 are metal supports that may be expanded as needed to receive additional nested platforms 108 for testing the residential gateways 102. The racks 106 may include connection components, such as holes, plates, shelves, bolts, and other components for securing the components of the test fixture 100.

In one embodiment, the nested platforms 108 may be slidably mounted to the racks 106 for more easily accessing the residential gateways 102. For example, the nested platforms 108 may be pulled out to insert or remove the residential gateways 102 before sliding the nested platforms 108 back in. As a result, the residential gateways 102 may be safely secured within the nested platforms 108 and electrically connected to the test fixture 100 for testing.

The computing devices 110 are one or more processing and logical components for executing testing routines, generating and processing the signals to and from the residential gateways 102. The computing devices 110 may be one or more micro super servers, servers, personal computers, or computing devices configured for testing the residential gateways 102. The computing devices 110 may also include fixed or programmable logic that is utilized to perform the testing. The software and instructions utilized by the computing devices 110 may be uploaded or changed as needed to perform the testing. The computing devices 110 may include testing and analysis instrumentation.

In one embodiment, the rear of the test fixture 100 may be open for easily adding or removing hardware components and for interfacing with the components of the test fixture 100 for easy adaptation and updates. For example, discrete computing devices 110 may be electrically connected to the test fixture 100 for testing different makes and models of residential gateways. The computing devices 110 may utilize a wired or wireless connection to connect to one or more databases for retrieving testing routines and storing test results. The databases may be updated to include new test routines, test instructors and software for updating the residential gateways 102 before or after testing, cleaning, and updating.

The keyboard 112 may be slidably extended from the test fixture 100 in order to receive user input. The keyboard 112 may be part of a user interface that may include a mouse, touch screen/pad, barcode scanner, or other peripheral components for receiving user input. The speakers 114 and display 104 may be utilized to audibly and visually communicate formatted content from the residential gateways 102 for the user to verify functionality. The eyes and ears of one or more users may be as valuable as any automatic tests to verify the functionality of the residential gateways 102 and to verify the testing process is proceeding correctly.

In one embodiment, the test fixture 100 may include one or more mechanical arms operable to press buttons, turn knobs, or otherwise physically interface with the residential gateways 102 during automatic testing. The mechanical arm may utilize x-y navigation similar to those utilized by printing and plotting devices to select the buttons. The mechanical arm may be programmed based on user interaction or based on information or coordinates entered into the test fixture. For example, a program executed by the test fixture 100 may ensure that physical testing of exterior features of the residential gateways 102 is performed.

The test fixture 100 may execute tests of any number of test categories (and associated tests, programs, or scripts), such as boot-up tests, internal tests, video tests, audio tests, remote control tests, Ethernet tests, HPNA tests, hard disk drive tests, and LED and buttons tests. The test categories may include individual tests including, but not limited to: set-top box information, memory, USB, MS key verification, boot software check, application flash, analog video, HDMI output, RF modulator, infrared remote key display, Ethernet ping, Ethernet bandwidth, HPNA ping, HPNA bandwidth, HDD test, HDD cleaning, LED, buttons, analog audio, digital audio (optical and coaxial), video tuner, application flash cleaning, infrared receiver, boot software upgrade, and application software. The test fixture 100 performs to both NTSC and PAL standards in addition, the test fixture 100 is configurable to any desired standard set forth by equipment provider's gold standards of testing within a particular network and equipment. The test fixture 100 may test various formats, standards, and protocols, such as standard definition or high definition residential gateways (e.g. 480i, 480p, 720p, 1080i content).

Figure 4:
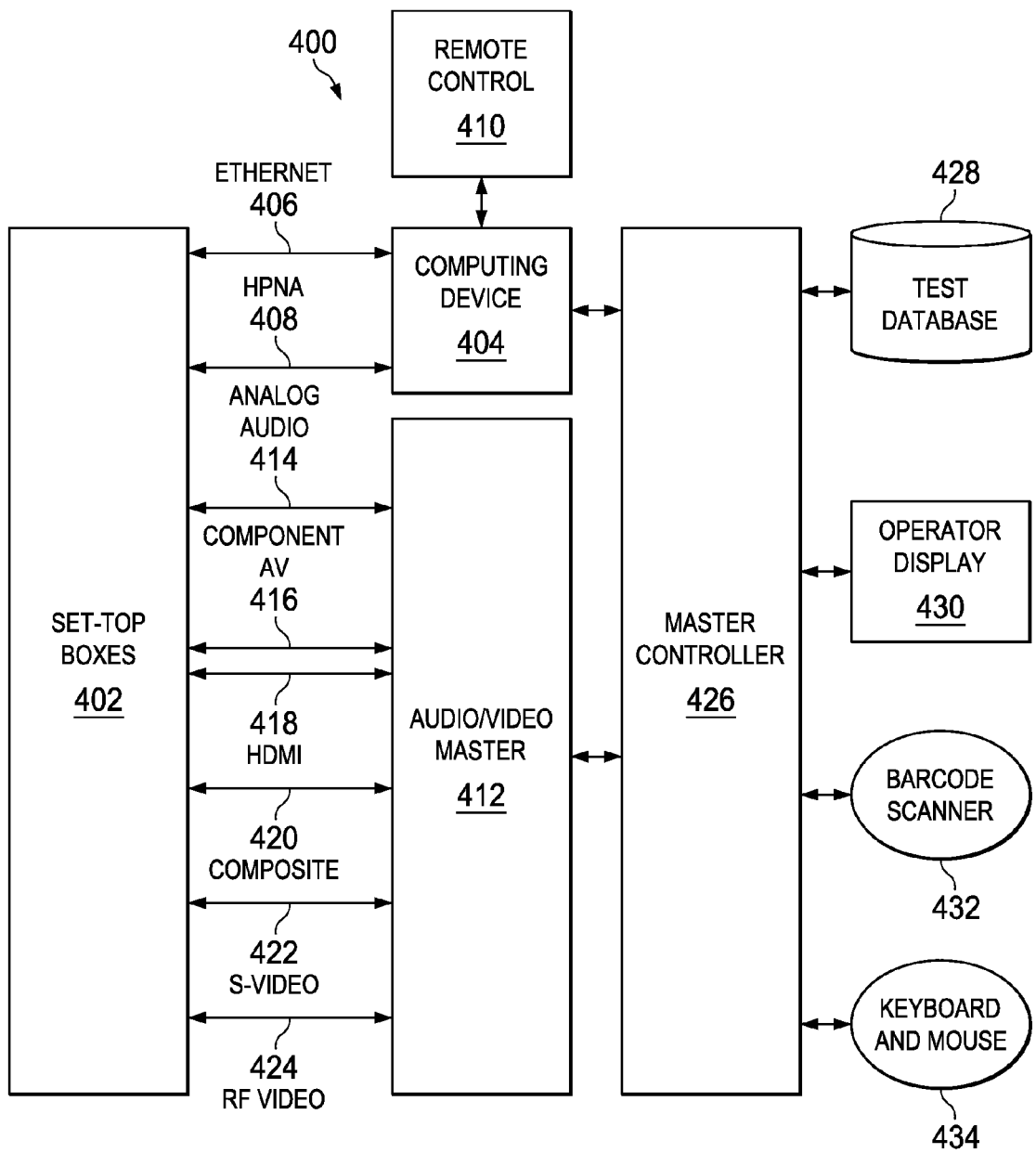
FIG. 4 is a block diagram of a test fixture in accordance with an illustrative embodiment.
Figure 5:
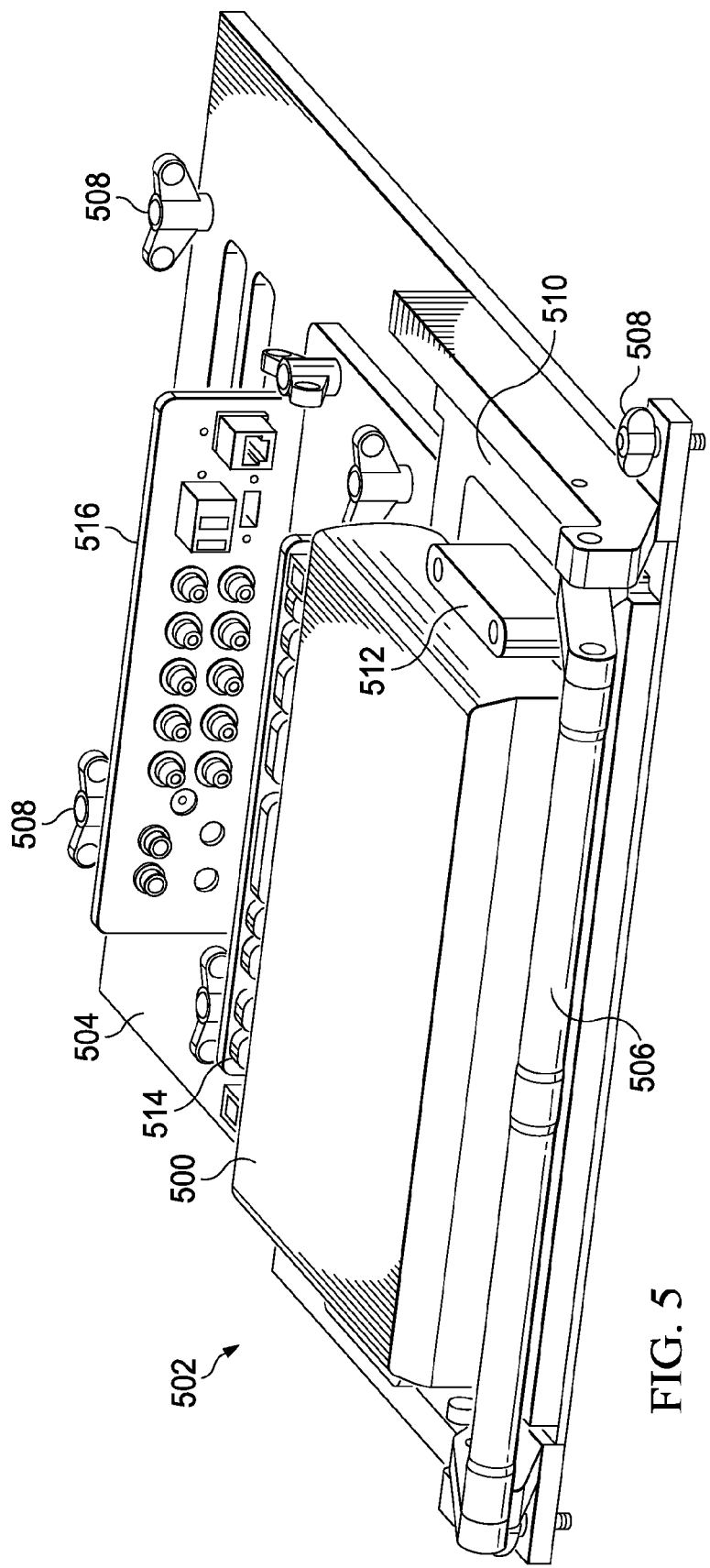
FIG. 5 is a pictorial representation of a set-top box in a nested platform in accordance with an illustrative embodiment.
Figure 6:
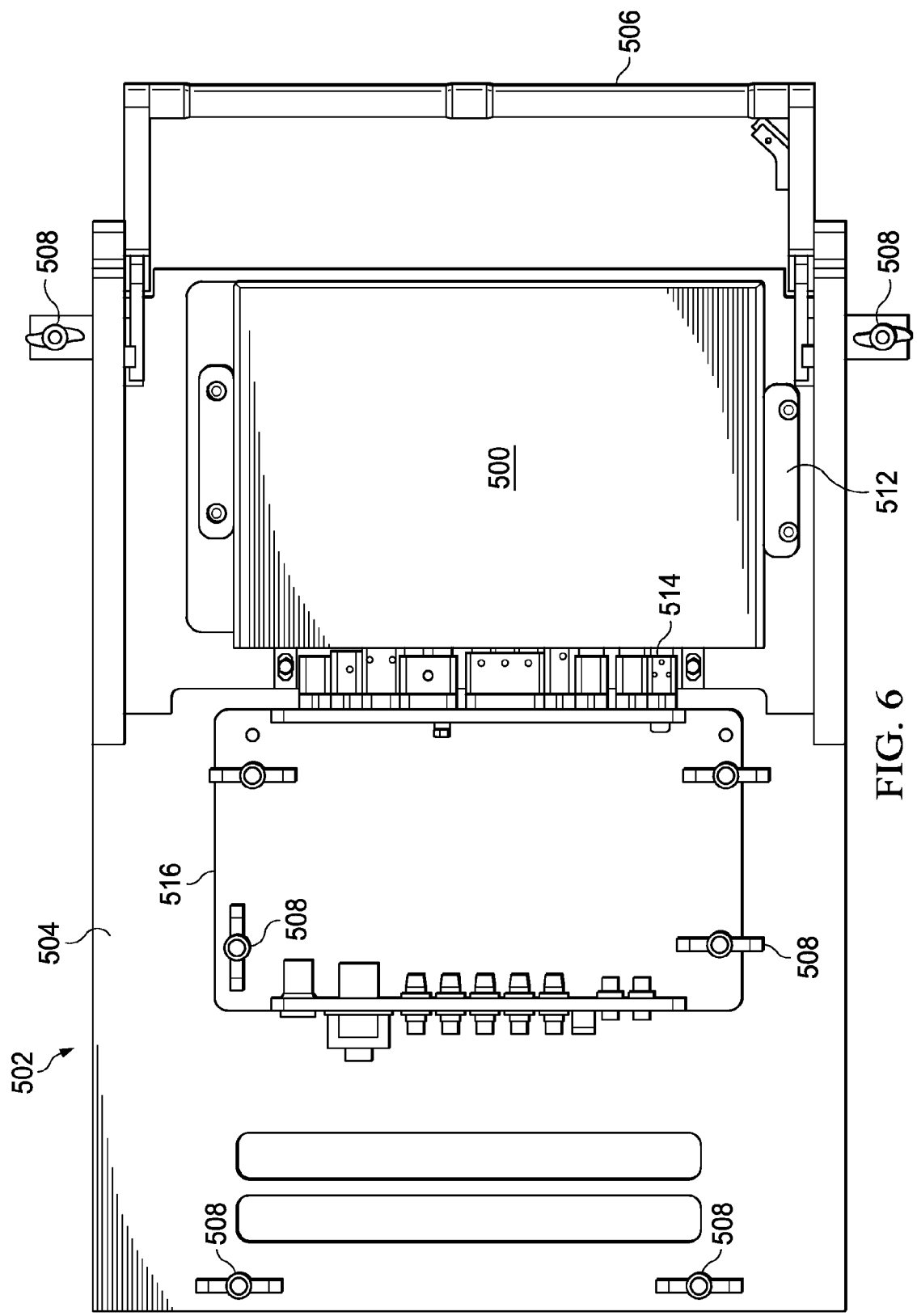
FIG. 6 is a pictorial representation of a top-view of a set-top box in a nested platform in accordance with an illustrative embodiment.
Figure 7:
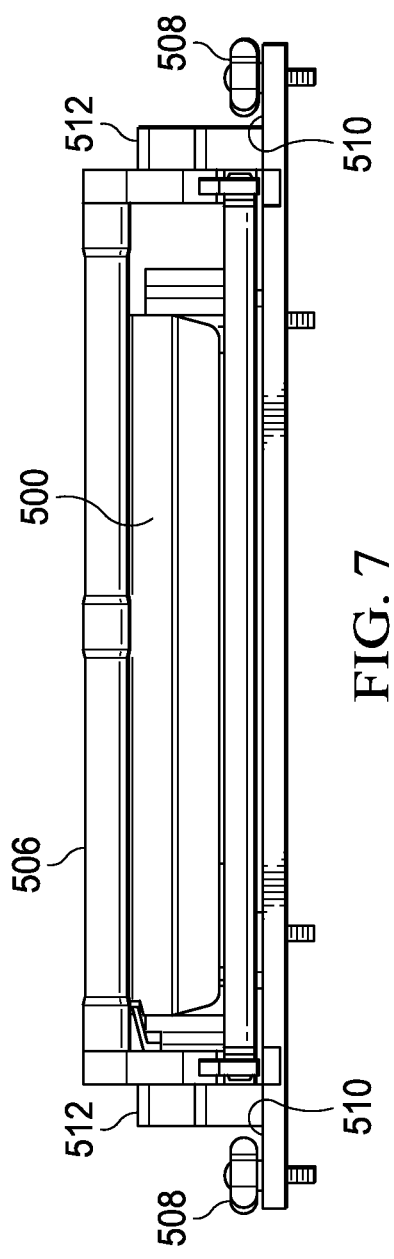
FIG. 7 is a pictorial representation of a front-view of a set-top box in a nested platform in accordance with an illustrative embodiment.
Figure 8:
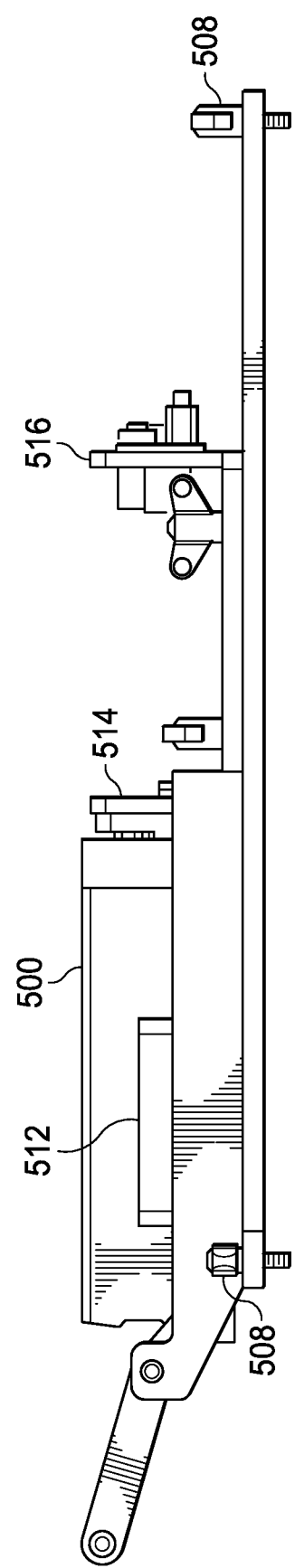
FIG. 8 is a pictorial representation of a side-view of a set-top box in a nested platform in accordance with an illustrative embodiment.

Turning now to FIG. 4 illustrating a block diagram of a test fixture 400 in accordance with an illustrative embodiment. The test fixture 400 may include any number of components that utilize innumerable different connection types. In one embodiment, the test fixture 400 includes residential gateways 402 that represent each of the residential gateways individually and collectively. The residential gateways 402 may be connected to computing devices 404 through an Ethernet connection 406 and a Home Phoneline Networking Alliance (HPNA) connection 408. Other connection types including USB, CAV, DVBS, firewire, and other future or still developing connection types.

The computing devices 404 may communicate with a remote control 410. The residential gateways 402 further communicate with an audio/video master 412 through an analog audio connection 414, a component audio video (AV) connection 416, a high-definition multimedia interface (HDMI) 418, a composite connection 420, an S-video connection 422, and an RF video 424 connection. Each of the connections between the residential gateways 402 and the computing devices 404 and the audio/video master 412 represent multiple connections for each of the numerous residential gateways 402. In addition, connections, such as the analog audio connection 414 and composite connection 420 may represent two or more physical connections based on the standard for the applicable interface.

The computing devices 404 and the audio/video master 412 may communicate with the controller 426. The communications may be performed utilize Ethernet PCI eXtensions for Instrumentation (PXI) or other similar connections. The controller 426 may also communicate with a test database 428, an operator display 430, a barcode scanner 432, and a keyboard and mouse 434. The computing devices 404, audio/video master 412, and controller 426 may be customized or off the shelf components or devices from companies, such as Cisco, National Instruments, Texas instruments, and Hewlett Packard.

The connections to the residential gateways 402 are configured to power the residential gateways 402 and communicate content to and from the residential gateways 402. The computing device 404 may perform control and switching for each of the residential gateways 402. For example, the computing devices 404 may include switches for routing the video signals to acquisition and analysis boards. In one embodiment, the test fixture 400 may share access to acquisitions boards and testing instrumentation. The controller 426 may lock out audio, video, and/or testing for all other residential gateways 402 when a single set-top box is being tested. The computing devices 404 may input parameters or inputs that are required to test the residential gateways 402.

The computing devices 404 may include multiple computing devices that communicate with the residential gateways 402 to ensure that the testing may occur in parallel without interference from testing of the other residential gateways. Each of the computing devices 404 may run a separate screen and clean program for testing and verifying the residential gateways 402. For example, the controller 426 may control the one or more computing devices 404 through a telnet session or other communications, session, or link.

In one embodiment, the computing devices 404 include multiple video and audio switches (e.g. four NI-PXI-2593 switches, a composite video, blanking, and sync (CVBS) switch, S-video switch, audio switch) with muxes, an RF switch, an HDMI switch, component/audio matrices, an Ethernet switch (e.g. connecting the controller 426 to the computing devices 404), demodulators (e.g. coax video to RCA video), multiple computing devices (e.g. 8 micro servers corresponding to each of the residential gateways 400), a keyboard and point device, a monitor/display, a bar code scanner, and multiple HPNA/Ethernet bridges. The computing devices 404 and other components may be mounted in a chassis of the test fixture 400 which may include racks and rails within a cabinet with wheels that is portable. In one embodiment, the switches described may allow multiple residential gateways 402 to be connected at once for parallel testing.

In one embodiment, the computing device 404 may utilize the remote control 410 to control the residential gateways 402. For example, infrared or Bluetooth signals may be utilized to initiate testing and functionality of the residential gateways 402. Due to reliance on remote controls, testing using the remote control 410 may be critical to ensure the full functionality of the residential gateways 402. Any number of other radio frequency, wireless or other signals may be utilized by the remote control 410 to interface with and test the residential gateways 402.

The audio/video master 412 may include a number of micro super servers (e.g. 8 units) which provides independent computation abilities from each of the residential gateways 402 to master controller 426. The master controller 426 processes all data between residential gateways 402, audio video equipment, all interface devices and control application programming.

The audio/video master 412 measuring equipment is modular based therefore adding to flexibility of utilizing additional configurations and enabling expansion as needed. The electronic and structural framework of the test fixture include multiple measuring and processing devices capable of delivering functionality and any number of stimuli as listed below which may then be processed by the master controller 426:

analysis of HDMI/DVI, composite, S-video, and component analog video (including HDTV and VGA); supports digital video analysis through Full HD (1080p 60 Hz) video; comprehensive audio analysis with single or multiple tones, amplitude and frequency sweeps, and more; analog audio generation and acquisition (e.g. acquisition at 204.8 kS/s with 24 bits of resolution); and digital audio acquisition for S/PDIF (e.g. 8-, 16-, 20-, and 24-bit depths from 22 to 192 kHz).

The controller 426 coordinates and controls the functionality of the computing device 404 which may include one or more devices. The controller includes coordinating software to control the test sequences initiated by the computing devices 404. The controller 426 may also retrieve testing programs, routines, and instructions from the test database 428. Similarly, testing results and an associated device identifier, such as serial number, hardware code, or other information, may be stored in the test database 428. The controller 426 determines the positioning of each of the residential gateways 402 in the nested platforms and tracks this information along with the specific test results for each of the residential gateways.

In one embodiment, the controller 426 may execute a master program for controlling the computing devices 404. However, additional programs may communicate with each other or may include master and servant programs. The controller 426 may execute any number of tests sequences, functions and drivers. In addition, the controller 426 may access inputs from one or more test input files stored locally in the controller 426 or stored in the test database 428. Similarly, the test results may be saved to the test database 428.

The operator display 430, barcode scanner, 432, and keyboard and mouse 434 are the user interface components for the user to receive results and status updates, and provide input. The barcode scanner 432 may be utilized to scan a bar code, numbers, engravings, UPC, or other markings of the residential gateways 402 corresponding to a selected position in the test fixture 400 for performing the testing. For example, a first device may be scanned by the barcode scanner 432 with the set-top box being placed into a first slot or nested platform. The nested platform may also have an associated barcode so that the user may scan in and save the relative positions of each of the residential gateways 402 allowing the user to more efficiently perform documentation and testing of the residential gateways 402 and automatically organize test results. Alternatively, the user may utilize the keyboard and mouse 434 along with the operator display 430 to manually enter information for each of the residential gateways 402.

In another embodiment, the barcode scanner 432 may be a radio frequency identification (RFID) tag reader. The RFID tag reader may identify or retrieve information from an RFID tag integrated with the residential gateways 402 or nested platforms. The test fixture 400 may automatically configure the tests based on the RFID tag or the barcode and the testing information associated with the identifier in the test database 428 to quickly and efficiently implement testing.

The test fixture 400 includes a number of hardware and software components including processors, memories, busses, interfaces, ports, wires, jumpers, cards, circuits, demodulators, converters, bridges, adapters, logic, and other standard computing and communications components that are not described for purposes of simplicity.

The processor may be circuitry or logic enabled to control execution of a set of instructions. The processor may be microprocessors, digital signal processors, application-specific integrated circuits (ASIC), central processing units, or other devices suitable for controlling a set-top box including one or more hardware and software elements, executing software, instructions, programs, and applications, converting and processing signals and information, and performing other related tasks. The processor may be a single chip or integrated with other computing or communications elements.

The memory is a hardware element, device, or recording media configured to store data for subsequent retrieval or access at a later time. The memory may be static or dynamic memory. The memory may include a hard disk, random access memory, cache, removable media drive, mass storage, or configuration suitable as storage for data, instructions, and information. In one embodiment, the memory and processor may be integrated. The memory may use any type of volatile or non-volatile storage techniques and mediums.

The memory and/or database may store data, information, specifications, or configurations for a number of residential gateways 402 and associated testing equipment. For example, the testing database 428 may store configurations of the testing routines for a number of different models, device types, adapters, versions, and so forth. As a result, a user interface of the operator display may more accurately indicate to the user whether the residential gateways 402 has passed one or more tests based on criteria, parameters, thresholds, percentages and requirements for the set-top box as stored in the testing database 428. The memory and the testing database 428 may be updated through a network connection as previously described. Additionally, the user interface may include other interfaces, such as a USB port for updating the testing database 428 through a thumb drive or other externally connected device or storage element. The memory and the testing database 428 may store testing scripts that run one or more tests on the residential gateways 402 in parallel, simultaneously, or in series.

In one embodiment, the memory or the testing database 428 may store a table. The table may be utilized to look up data or information for configuring the test fixture 400 and adapter modules. For example, based on user input received through the peripherals or information automatically determined by the test fixture, the table may prepare test routines for testing the residential gateways 402. The table may also be utilized to determine functionality or non-functionality of the residential gateways 402 based on the performance characteristics measured during testing of the residential gateways 402. For example, based on returned data, audio and video characteristics, and threshold values for voltage, current, and resistance, the table may display a pass or fail indicator through the user interface. The table may store information, data, and a number of threshold values for passing, failing, or generating a diagnostic report for each of the residential gateways 402.

In one embodiment, different OEMs or service providers may have specific test configurations, scripts, specifications, tolerances, or parameters that are required for residential gateways 402 or that are utilized or associated with their company, products, or network. In one embodiment, updates are received directly from an OEM or service provider for use by the testing party. In another embodiment, the barcode scanner 432 may retrieve information that is used to automatically determine the testing parameters and information associated with the residential gateways 402.

Turning now to FIGS. 5-8 illustrating different views of a set-top box 500 in a nested platform 502 in accordance with an illustrative embodiment. The nested platform is a testing platform for securing the set-top box 500 and electrically connecting the set-top box 500 to the test fixture. The nested platform 502 may include a plate 504. The plate 504 may allow different components to be attached to and integrated with it for customizing the nested platform 502. The nested platform 502 may include a handle 506 for sliding a portion of the nested platform 502 and set-top box 500 out for easy access by a user. In one embodiment, the handle 506 may be pivotally attached to the nested platform 502 and may be folded back during insertion and removal and positioned down in a lock position during testing.

The nested platform 502 may include bolts 508 for attaching the nested platform to sliding arms, racks, shelves, or other structural components of the test fixture. The bolts 508 may include knobs, handles, toggles, or other components that allow the bolts be attached with or without tools, such as screwdrivers or wrenches. The nested platform 502 is designed to be easily attached to or removed from the test fixture. As previously described, multiple nesting platforms may be utilized to scale the test fixture for a desired number of residential gateways.

The nested platform 502 may further include a base plate 510. The base plate 510 is a support structure or framework for supporting or holding a portion of the set-top box 500. For example, the base plate 510 may support a bottom portion of the set-top box 500. The base plate 510 may attach to the plate 504. The base plate 510 may be a solid, lattice, honeycomb, checkerboard, or other structure.

In one embodiment, the nested platform 500 is composed entirely of non-conducting or non-metallic elements in order to provide accurate RF testing results if necessary. Metal within any of the components of the nested platform 500 may adversely reflect or absorb RF signals generated by the set-top box, thereby affecting the results of the testing. The base plate 510 and nested platform 500 may be of any size to accommodate large residential gateways as well as small network devices.

In one embodiment, the base plate 510 is a support configured to receive a particular model of set-top box. The base plate 510 allows the set-top box 500 to be securely and stably positioned or nested during testing. For example, the base plate 510 may be sized to receive a specific model of set-top box for testing. The base plate 510 may be or include a mold or cut-aways operable to support all or a portion of the set-top box 500. The shape of the mold may be determined by outer dimensions of the set-top box 500. The orientation of the base plate 510 may be determined by the positioning of the internal or external and optimal position of the set-top box 500. The set-top box 500 may be sized and configured to support any of the residential gateways herein described.

The guides 512 may be arms or supports that secure the set-top box 500 when placed in the nested platform 502. For example, the guides 512 and base plate 510 may keep the set-top box 500 from shifting when the test fixture is moved. In one embodiment, the guides 512 are detachable arms that may be adjusted to the size of the set-top box 500. The base plate 510 and/or guides 512 are preferably sized such that the set-top box 500 is held securely or snugly during testing. The base plate 510 ensures that each set-top box is uniformly secured (position and location) during testing for helping a user more easily connect the set-top box 500 to the adapter module 514. The nested platform 502 and overall test fixture provides a system and method for performing testing and duplicating testing between different parties. In addition, a single test fixture may be utilized to test multiple devices.

In one embodiment, the set-top box 500 is positioned on the base plate 510. The set-top box 500 may be secured by a number of guides 512. The guides 512 may be removable or may be slidably attached to the base plate 510. The guides 512 are supports or stops that support the set-top box 500. In particular, the guides 512 may secure the set-top box 500 and prevent the set-top box 500 from slipping or moving during testing or once attached to an adapter module 514.

The guides 512 may physically secure the set-top box 500 to the nested platform 500. The guides 512 may include any number of shapes. In one embodiment, the guides are rectangular shaped. In another embodiment, the guides 512 are a flattened-oval shape with rounded edges and made of a rubber composite for abutting the set-top box 500. The guides may also be L-shaped, rounded, or semi-circular to accommodate a corner of the set-top box 500 or other distinct shapes.

Bolts or set screws may pass through holes or slots defined by the guides 512 in order to entirely remove the guides 512 from the base plate 510 and corresponding nested platform 500. In another embodiment, the set screws may only be loosened (without disengaging the guides entirely), thereby allowing the guides to be moved or positioned on the base plate. In one embodiment, the guides may be moved along slits or tracks defined in the base plate 510 or plate 504 to reach a desired position.

A base plate 510 may include a cut-out at the edges of the set-top box 500 allowing a user to easily remove the set-top box 500 after performing testing. Additionally, other pop-out mechanisms, such as a lever under the set-top box 500, may be incorporated with the base plate 510 for removing the set-top box 500 after testing.

The nested platform 502 may be compatible with any number of base plates 510 or molds. The configuration of the base plate 510, guides 512, and adapter module 514 may vary by set-top box. Slits within the plate 504 and base plate 510 may be utilized to position the components of the nested platform 502 to meet the physical configuration of each set-top box 500.

The components that compose or are attached to the nested platform 500 may be molded, manufactured, or created from a single material or multiple materials. For example, the nested platform 500 may be composed entirely of plastic, composites, wood, rubber, nylon, or any number of materials that maximize or enhance the testing as performed for the set-top box 500 positioned on the nested platform 500. In one embodiment, the test fixture is formed from acetal (such as Delrin manufactured by DuPont, a homopolymer acetal), a thermoplastic. Acetal and other similar thermoplastics have the ability to absorb electromagnetic energy maximizing the effectiveness of the RF testing. In one embodiment, the bolts or set screws may be made from nylon. The nested platform 500 and components may be generated utilizing a Computer Numerical Control (CNC) machine, molded from individual parts, or custom made utilizing hand tools.

The adapter module 514 is an electrical and mechanical hardware interface to the ports, receptacles, jacks, inputs, and outputs of the set-top box 500. The adapter module 514 may be utilized to power, and communicate and receive signals to the set-top box 500 through hardware connections (both male and female connections and connectors). The adapter module 514 may include any number of connection points as previously described in FIG. 4. For example, the adapter module 514 may include male connectors for simultaneous mechanical engagement of all the female connectors of the set-top box 500. In one embodiment, the adapter module 514 interfaces directly with the electrical, processing, and communications components of the test fixture. For example, the adapter module 514 may communicate with the test fixture utilizing traces, wires, cables, fiber optics, or other communications or signal mediums known in the art. The base plate 510, stops 512, and adapter module 514 are operable to receive the set-top box 500 as a customizable docking station.

The adapter module 514 may correspond to a specified model or configuration of a set-top box 500. The user may select one of multiple adapter modules 514 that correspond to a selected set-top box 500. As previously indicated, the adapter module 514 may include an identifier or markings that may be associated with the nested platform 502 through scanning, automatic detection, or user entries during testing. In one embodiment, the test fixture may be operable to test a single type of set-top box at a time. In another embodiment, the test fixture may test multiple different types or configurations of residential gateways in response to configuration of the nested platform 502 with an adapter module In one embodiment, the adapter module 514 may be connected to an interface 516. The interface 516 may be utilized as a generic connector to the test fixture. The interface 516 is similarly an electrical and mechanical hardware connector to the test fixture. As a result, even if a different adapter module 514 is attached to the plate 504 or base plate 510, the interface 516 may still be utilized to connect to the test fixture. For example, a number of cables and wires may connect the computing device and testing instrumentation of the test fixture to the interface 516. The adapter module 514 and interface 516 may be connected through fixed, flexible, integrated, or independent connections. In one embodiment, the adapter module 514 and interface 516 are integrated.

The adapter module 514 and interface 516 may include a vertical portion extending perpendicularly from the plate 504 and a horizontal portion for connection each of the adapter module 514 and interface 516 to the plate 504. The adapter module 514 and interface 516 may be connected to the plate 504 through slots, holes, slits, or other connection components known in the art.

Figure 9A:
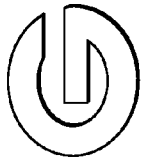

Turning now to FIG. 9 illustrating a pictorial representation of a graphical user interface 900 in accordance with an illustrative embodiment. The graphical user interface 900 may be utilized to communicate information to a user for testing residential gateways. In one embodiment, the graphical user interface 900 includes a number of menus and interfaces that may be navigated to perform testing. The graphical user interface 900 allows the user to interact with the automatic execution of test sequences for residential gateways.

In one embodiment, the graphical user interface 900 may display the tests run in parallel or using a sequential process model. The graphical user interface 900 may be operable to display results in real-time based on the testing status and results. The graphical user interface 900 may display the serial number, model, firmware, HDD size, and manufacturing information deemed necessary to be displayed from the set-top box member. The graphical user interface 900 may also display information regarding fixtures, adapter modules, or other components associated with testing and the relative positioning of these components. The results of the graphical user interface 900 may be displayed in different colors. For example, white with a black border may be the default color, green may indicate the set-top box passed, red indicates a failure, and orange may indicate an application error occurred or set-top box was removed prior to test completion. A yellow color may indicate user attention is required. The user interface 900 may allow a user to quickly evaluate the parallel testing of the residential gateways as results are monitored and parsed. In one embodiment, tests for audio/video tests, remote tests, and only LED and button tests may require specific user interaction. These user interactions may be automated with mechanical or electrical station devices.

The graphical user interface 900 may graphically illustrate testing for multiple residential gateways corresponding to one or more test fixtures. As previously described, the number of residential gateways or other electronic devices tested by the test fixture is not limited. In another embodiments, the graphical user interface 900 may be transmitted to other local or remote displays, tablets, wireless device, or communications or computing devices utilized by a user during the testing of the residential gateways.

The user interface 900 may display the status of the testing, test results, and video content from the residential gateways for evaluation by the user. For example, a composite matrix 902 is shown for a seventh set-top box being tested. The composite matrix 902 may include patterns, a color bar, a luminance bar, and a composite pulse or multibursts. Video content may also be played to the user interface by any of the residential gateways.

In one embodiment, the information and data for the residential gateways may include a serial number, model identification, IP address, hardware revision, MAC address (Ethernet and/or HPNA), HDD info, and boot flash information.

The graphical user interface 900 may display tests results, such as pass, fail or reasons for failing. In one embodiment, the tests may include boot-up, internal, video, audio, remote control, Ethernet, HPNA, memory (e.g. hard drive and flash), and LED and button tests. Detailed parametric date in file form may be available for determining root cause, process capability index, and other quality metrics for reporting. In some cases, portions of the tests may be performed automatically with other tests being performed based on manual user selections. For example, the user interface 900 may prompt the user to push buttons on each of the residential gateways or a remote control to perform the necessary testing.

FIG. 10 is a flowchart of a process for testing a set-top box in accordance with an illustrative embodiment. The process of FIG. 10 may be implemented by a user 1002 and a test fixture 1004 in accordance with one embodiment. The order of the steps in FIGS. 10 and 11 may be varied based on environment, conditions, and user preferences.

The process may begin with the user 1002 retrieving a set-top box for testing (step 1006). The set-top box may be tested as part of returns, replacement, refurbishment, or repair process or other procedure that may require verification of the functionality of the set-top box.

Next, the user 1002 selects an adapter module for the set-top box (step 1008). The adapter module represents adapters or interfaces for testing the specific model or type of set-top box. The base plate and other components of the nested platform may similarly be selected and connected for properly receiving each of the set top-boxes. The adapter module may include labels, markings or other indicators associating each of the module types with one or more makes, models, or types of mobile devices for identification by a user or automated element, such as a scanner. If the adapter module was previously connected for testing a similar or identical model of set-top box, step 1002 may be skipped.

Next, the user 1002 attaches the adapter module to the nested platform of the test fixture (step 1010). In one embodiment, wired or wireless connections may be established between the adapter module and the electrical components of the test fixture 604.

Next, the user 1002 scans a serial number of the set-top box from a label, scans a user selected slot number of the set-top box, inserts the set-top box into the nested platform of the test fixture 1004, and engage the set-top box in the adapter module in response to user input (step 1012). The nested platform may be extended from the test fixture 604 utilizing a handle or other components to more easily insert or remove the set-top box. The test fixture 1004 may include a wireless or wired laser bar code scanner or RFID scanner for scanning the set-top box and applicable slot of the test fixture 1004. In one embodiment, during step 1012, the user 1002 may pull down a handle to engage the set-top box in the adapter module.

Next, the test fixture 1004 initiates testing of the set-top box automatically (step 1014). Step 1004 may also involve retesting the set-top box. The testing may be performed in response to the user 102 scanning the set-top box and fixture selection (slot). As previously described, the adapter module must be electrically connected to the test fixture in order for the set-top box to be energized and subsequently tested. In one embodiment, each set-top box may be automatically tested in response to being connected to the test fixture. In another embodiment, the user may initiate the testing for each of the residential gateways. For example, the user may provide a command code to begin the process. If portions of the test fail, the user may be prompted to restart the test, rerun specific tests, run manual tests, or use a different process.

In one embodiment, before the testing may be initiated, a telnet session may be started and root access to the set-top box may be required. In addition, the serial number or other identifier scanned by a barcode scanner or entered manually may be compared against a serial number automatically retrieved from the firmware of the set-top box. For example, the process may be restarted if the serial number or other identifier is not verified within a designated time period. In addition, if the serial numbers do not match the testing sequence is aborted. The tests performed may be selected automatically or manually by a user. For example, a list of check boxes corresponding to tests may be selected by the user to initiate specific tests.

Next, the test fixture 1004 analyzes signals and tests results received from the set-top box to determine functionality or non-functionality of the set-top box (step 1016). The testing instrumentation of the test fixture 1004 may compare signals and results against thresholds, ranges, parameters, or expected results.

Next, the test fixture 1004 displays the analysis and indicators to the user 1002 (step 1018). The analysis and indicators may be displayed in alphanumeric format or utilizing visual indicators, such as a user interface, green or red LEDs, or other displays to indicate that the set-top box has passed or failed according to specified parameters stored by the set-top box or utilized by the user 1002. In addition, audio and video content including test images, sounds, or content may be communicated to the user 1002 through the test fixture 1004 for analysis.

Simultaneously, the user 1002 reviews the displayed analysis to determine functionality of the set-top box (step 1020). The user 1002 may provide additional feedback for user specific audio, video, light, remote, or button tests to pass or fail each of the residential gateways.

Next, the test fixture 1004 completes testing (step 1022). In one embodiment, the test fixture 1004 may save the test results locally or to an external device or database. The user 1002 may electronically or physically mark the residential gateways that pass or fail for subsequent analysis. For example, a fail code may be associated with a serial number of a set-top box that failed one or more of the tests run by the test fixture 1004.

Figure 11:
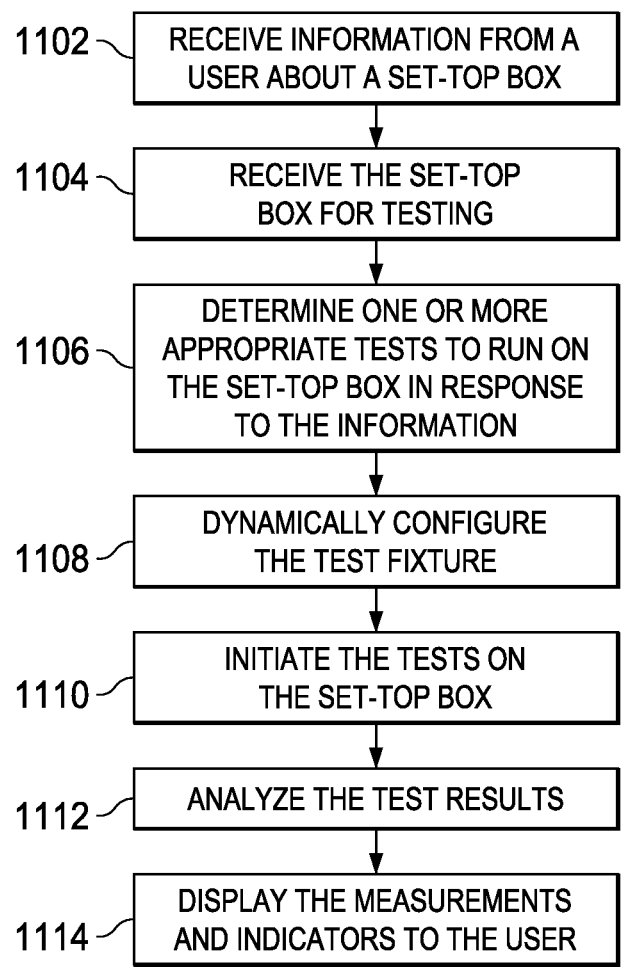
FIG. 11 is a flowchart of another process for testing a set-top box in accordance with an illustrative embodiment.

FIG. 11 is a flowchart of another process for testing a set-top box in accordance with an illustrative embodiment. The process of FIG. 11 may be implemented by a test fixture based on interaction with a user to test a set-top box. The process of FIG. 11 may be implemented on multiple residential gateways individually, simultaneously, sequentially, or with partial overlap. The process may begin by receiving information from a user about a set-top box (step 1102). The information may include functional parameters for the set-top box. For example, the information may specify a make, model, hardware, firmware, operating system version, or other information associated with the set-top box. In one embodiment, the test fixture may include a scanner, such as a barcode scanner that scans a barcode or other identification information on the set-top box.

Next, the test fixture receives the set-top box for testing (step 1104). For example, the set-top box may be electrically interfaced with the test fixture and the set-top box secured for testing.

Next, the test fixture determines one or more appropriate tests to run on the set-top box in response to the information (step 1106). For example, particular brands of residential gateways may require a specified testing routine from an OEM or service provider to perform the required tests and scan for CPI.

Next, the test fixture dynamically configures the test fixture (step 1108). The test fixture sets the number and types of tests as well as fixed or variable testing parameters and how the test results are recorded or communicated.

Next, the test fixture initiates testing on the set-top box (step 1110). For example, the test fixture may power the set-top box and automatically initiate testing in response to determining the set-top box is interfaced with the test fixture.

The test fixture analyzes the test results (step 1112). The analysis may be established based on pre-set criteria, thresholds, or parameters set by the set-top box manufacturer or a service provider that provides the set-top box to customers. During step 1112 the test fixture processes signals and data to determine whether the set-top box has passed a number of tests.

Next, the test fixture displays test measurements and indicators to the user (step 1114). The test measurements and indicators are displayed for the user to evaluate and to take additional actions, such as marking defective residential gateways, performing CPI removal, updating software, and performing other necessary steps. The measurements and indicators may also be stored and/or communicated to an external device.

In one embodiment, the described process may be looped or repeated for different modes or connectors of the set-top box. For example, standard definition outputs and features may be tested before moving to high definition outputs.

Figure 12:
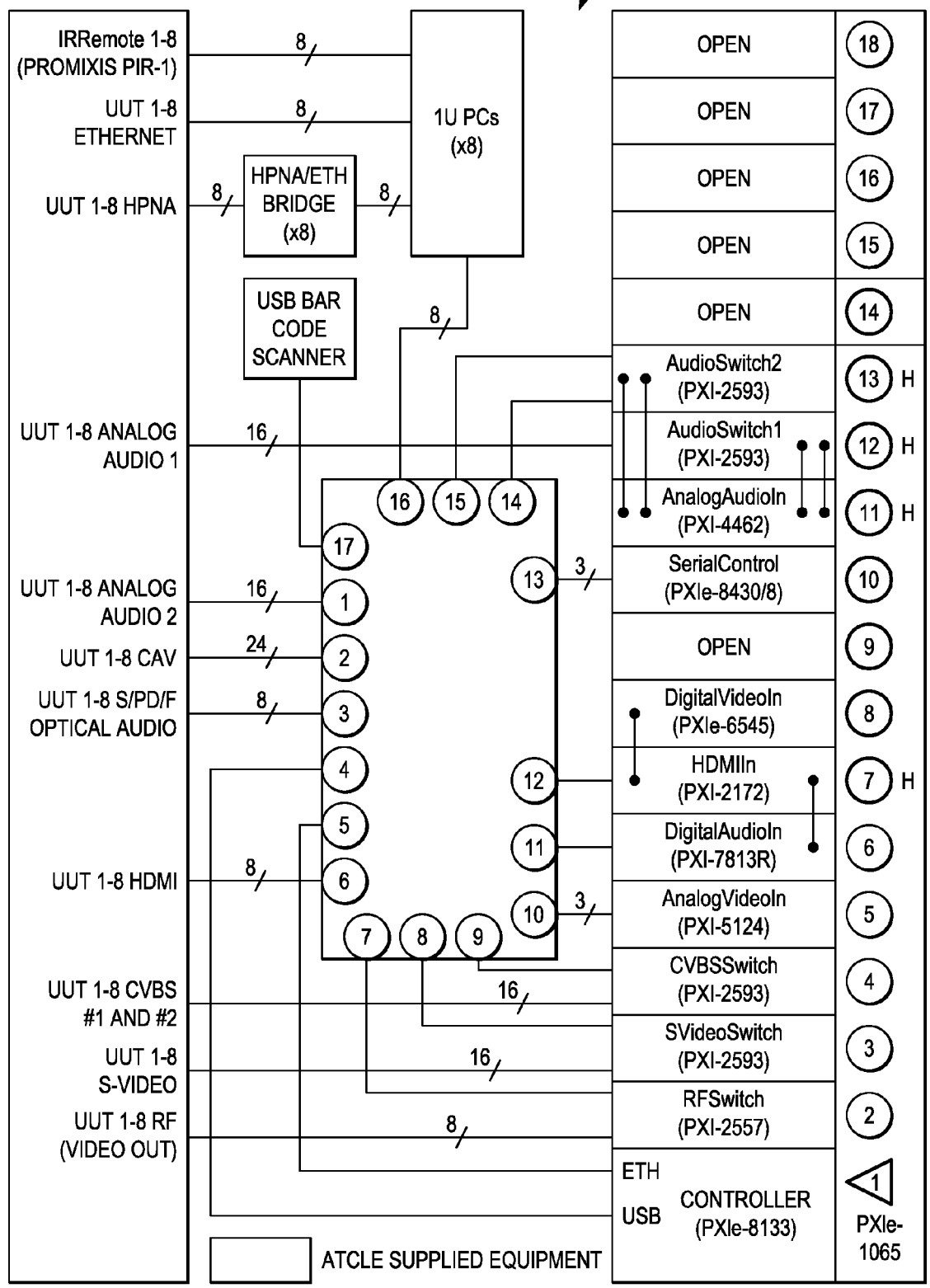
FIG. 12 is a pictorial representation of testing instrumentation and connections of the test fixture of FIG. 4 in accordance with an illustrative embodiment.
Figure 13:
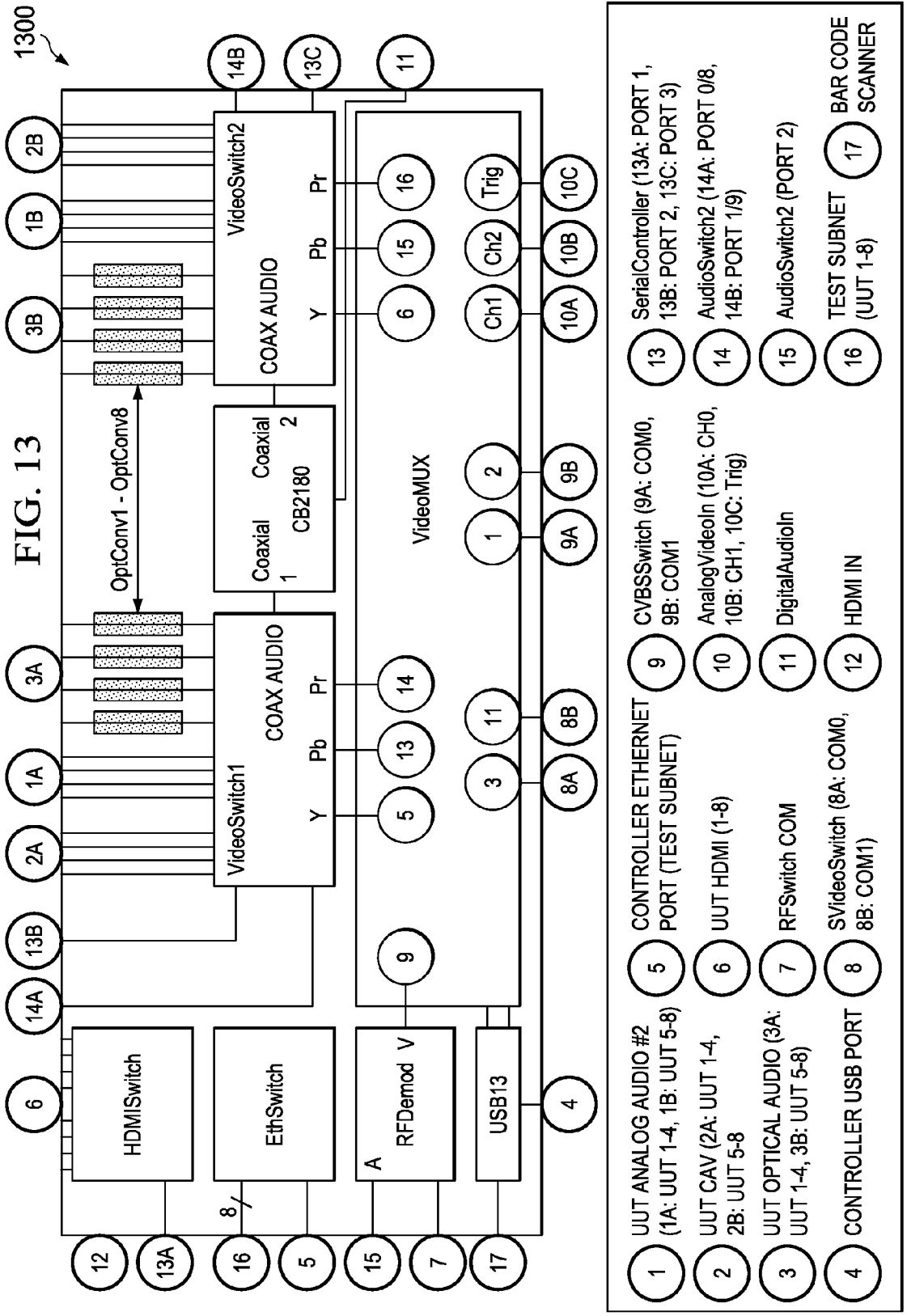
FIG. 13 is a pictorial representation of testing instrumentation and connections of the test fixture of FIG. 4 in accordance with an illustrative embodiment.

FIGS. 12 and 13 are an example of testing instrumentation and connections of the test fixture of FIG. 4 in accordance with an illustrative embodiment. FIG. 12 shows one example of a system 1200 for use in the test fixture. FIG. 13 shows further a further example of a system 1300 for use in the test fixture. FIGS. 12 and 13 are shown as examples of components of the test fixture configured for one set-top box and illustrate the components may be connected for a particular set-top box and are not meant to be limiting.

The systems 1200 and 1300 may be utilized to both switch between video and audio input to the set-top box and video and audio outputs received from the set-top box. As a result, redundant testing equipment is not required to test the multiple residential gateways in parallel. Instead, the systems 1200 and 1300 are operable to switch for testing each of the residential gateways. In another embodiment, the systems 1200 and 1300 may switch between two or more sets of testing equipment.

The systems 1200 and 1300 may include several switches. The switches may allow multiple residential gateways or units under test (UUTs) to be connected at the same time and share a single set of video and audio hardware. Any number of cables, traces or wires may be utilized to interconnect the systems 1200 and 1300 and the different components of the test fixture.

The systems 1200 and 1300 may include instrumentation for acquiring analog video signals (Analog Video In) and for digital video signals (DigitalVideoIn), such as HDMI video signals. The set-top box (e.g., UUT) may supply a modulated RF Video output on either channel 3 or 4. A modulated output may need to be converted to CVBS to allow the output to be measured with a video analyzer (e.g., NI Analog Video Analyzer (PXI) VideoMaster).

The conversion from RF Video to CVBS may be performed using a RF Coax Video to RCA Video Audio Demodulator (RFDemod). The signals from the residential gateways may be connected to the RFSwitch. The common port of the RFSwitch is then connected to the RFDemod. The HPNA ports may be converted to Ethernet using HPNA/Ethernet bridges. The bridges may reside on a component shelf within the test fixture with an RF cable connecting the bridges to the test fixture.

Some residential gateways may include two CVBS output ports. The signal from the output ports may be communicated through a switch to select the appropriate set-top box and the resulting signal may then be sent to a VideoMUX. The CVBS signals of the test fixture may be directly connected to the CVBSSwitch. The COM0 and COM1 of the CVBSSwitch may be connected to the VideoMUX.

In one embodiment, the VideoMUX may provide connections for 2 combined audio video (CAV) signals. To reduce the multiple CAV signals down to two, a pair of video matrices (e.g., Gefen 4×4, VideoSwitch1 and VideoSwitch2) may be used. The Y, Pb, and Pr signals for one set-top box may use the same cable. These cables are connected between the video switches and the residential gateways. The first output of each video switch may be connected to the VideoMUX.

Each set-top box may include a single S-Video output. In one embodiment, there may not be enough connections on the VideoMUX for as many as eight S-Video connections in parallel. As a result, the SVideoSwitch may be used to reduce the number of connections down to one. COM0 and COM1 on the SVideoSwitch may be connected to the VideoMUX.

The VideoMUX may provide routing for 16 signals to the 2 inputs on the AnalogVideoIn. The VideoMUX may be configured in different ways based on the number and type of video connections present. For system 1200 the VideoMUX may be configure in a "4xCVBS+2xSVideo+2xCAV" mode. There may be sixteen 16 75-Ohm BNC females on the front of the VideoMUX that connect with various video signals. For cables using an RCA connector, an RCA-to-BNC converter will be used on the front of the VideoMUX. The VideoMUX may provide the following connectivity.

VideoMux Connections
1 CVBS1 CVBSSwitch COM0
2 CVBS2 CVBSSwitch COM1
3 S-VideoYs1 SVideoSwitch COM0
4 S-VideoYs2 OPEN
5 CAV Ys1 VideoSwitch1 Ys1 out
6 CAV Ys2 VideoSwitch2 Ys1 out
7—OPEN
8—OPEN
9 CVBS3 RFDemod CVBS out
10 CVBS4 Open
11 S-VideoC1 SVideoSwitch COM1
12 S-VideoC2 OPEN
13 CAV Pb1 VideoSwitch1 Pb1 out
14 CAV Pr1 VideoSwitch1 Pr1 out
15 CAV Pb2 VideoSwitch2 Pb1 out
16 CAV Pr2 VideoSwitch2 Pr1 out
H H OPEN
V V OPEN
CH0 Output 1 AnalogVideoIn CH0
CH1 Output 2 AnalogVideoIn CH1
Sync1 S1 OPEN
Sync2 S2 OPEN
Trig Trigger AnalogVideoIn TRIG Each set-top box may include an HDMI port. In one embodiment, the system 1200 may have only a single input (HDMIIn). As a result, the multiple HDMI signals may need to be sent to an 8×1 HDMI Matrix (HDMISwitch). The common on this switch may be connected to the HDMIIn.

In one embodiment, there is one testing instrument (AnalogAudioIn) for acquiring analog audio signals and one (DigitalAudioIn) for digital (non-HDMI) audio signals. The different audio signals are connected to the system 1200 as described in the following sections. Each set-top box may include two analog audio outputs as well as analog audio on the RF output. The AnalogAudioIn device may accept two analog audio pairs. An 8×1 MUX may be required to select the appropriate set-top box to test. Set-top box analog audio #1 may be connected to the AudioSwitch1. Set-top boxAnalog audio #2 may be connected to VideoSwitch1 and VideoSwitch2. The analog audio outputs from the video switches as well as the single mono analog audio signal from RFDemod may be connected to AudioSwitch2. COM0 and COM1 of AudioSwitch1 may be connected to AIN0 and AIN1 of AnalogAudioIn. COM0 and COM1 of AudioSwitch2 may be connected to AIN2 and AIN3 of AnalogAudioIn.

Each set-top box may include an optical audio output. The optical audio output may connect to the DigitalAudioIn through the CB2180 connection block. The connection block may supports two optical audio inputs and two coaxial digital audio inputs. Therefore, switching may be required to reduce the number of optical audio signals to two. The existing VideoSwitch1 and VideoSwitch2 may include coaxial digital switches. Therefore, to simplify the test fixture, the eight optical audio signals may be converted to coaxial digital audio signals using OptConv1-OptConv8 and then switched using VideoSwitch1 and VideoSwitch2.

HDMI audio may share most of the same path as the HDMI video. There may be three instruments that require serial communication for control. The SerialControl peripheral may be responsible for communication with the three instruments (VideoSwitch1, VideoSwitch2, and HDMISwitch).

There may be eight IR remote controls, a bar code scanner, and the VideoMUX that all require USB communication. Each IR remote control may be attached or communicate with associated computing device. The bar code scanner may be connected directly to a USB port on the controller. The VideoMux may require two USB ports in order to satisfy power requirements. To accomplish this, a USB hub (USB13) may be connected to a port on the controller. Then the VideoMUX's double USB cable may be connected to two ports on USB13.

In one embodiment, each set-top box may have two data channels, one Ethernet and one HPNA. The HPNA port may be tested via an HPNA bridge and thus converted to Ethernet. Each resulting pair of Ethernet connections may be connected to the associated computing device. In addition, each computing device as well as the controller may be connected to the EthSwitch (16-port Ethernet switch) to allow communication.

Figure 14:
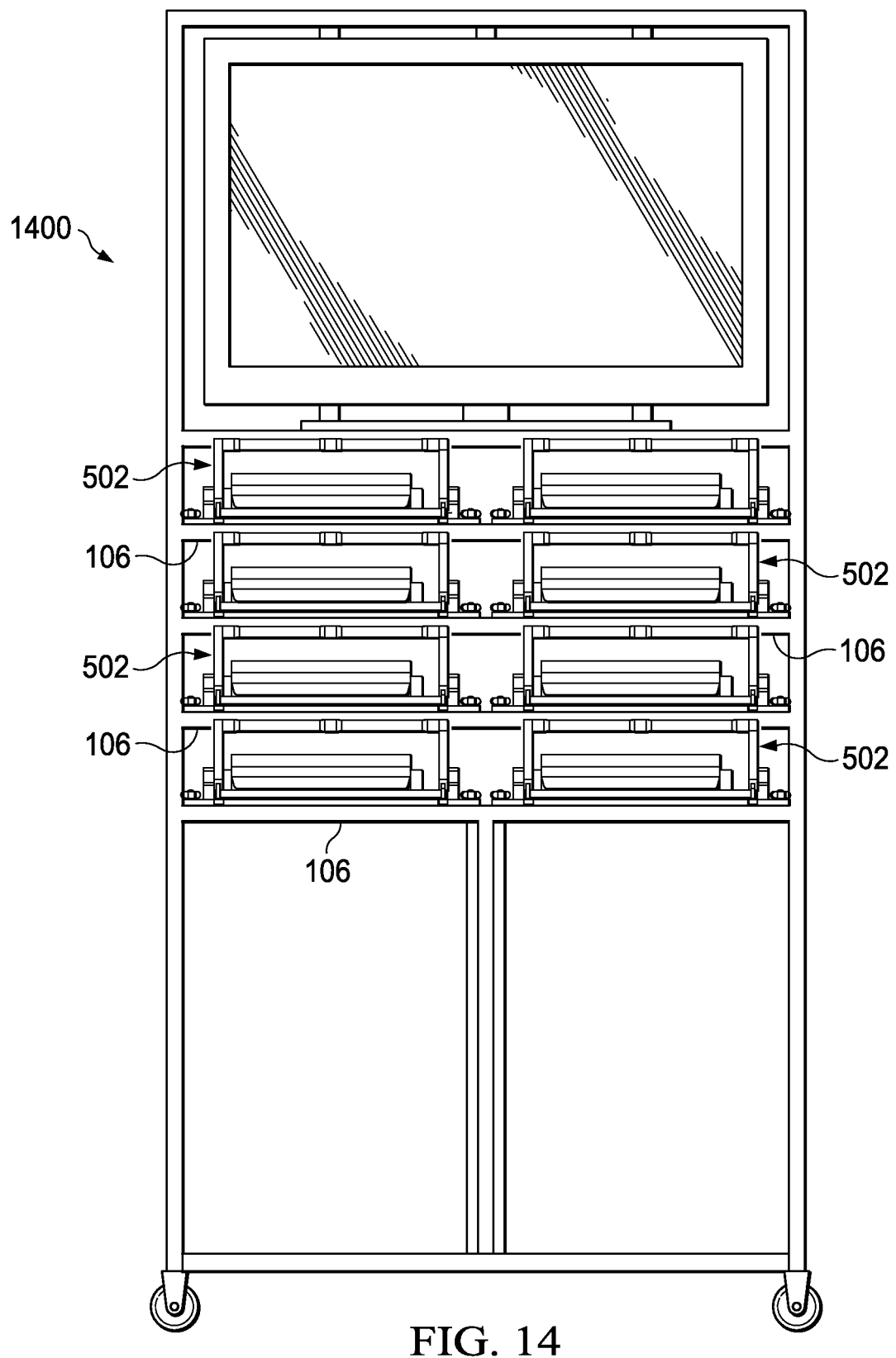
FIG. 14 is a pictorial of a front view of a test fixture of in accordance with an illustrative embodiment.
Figure 15:
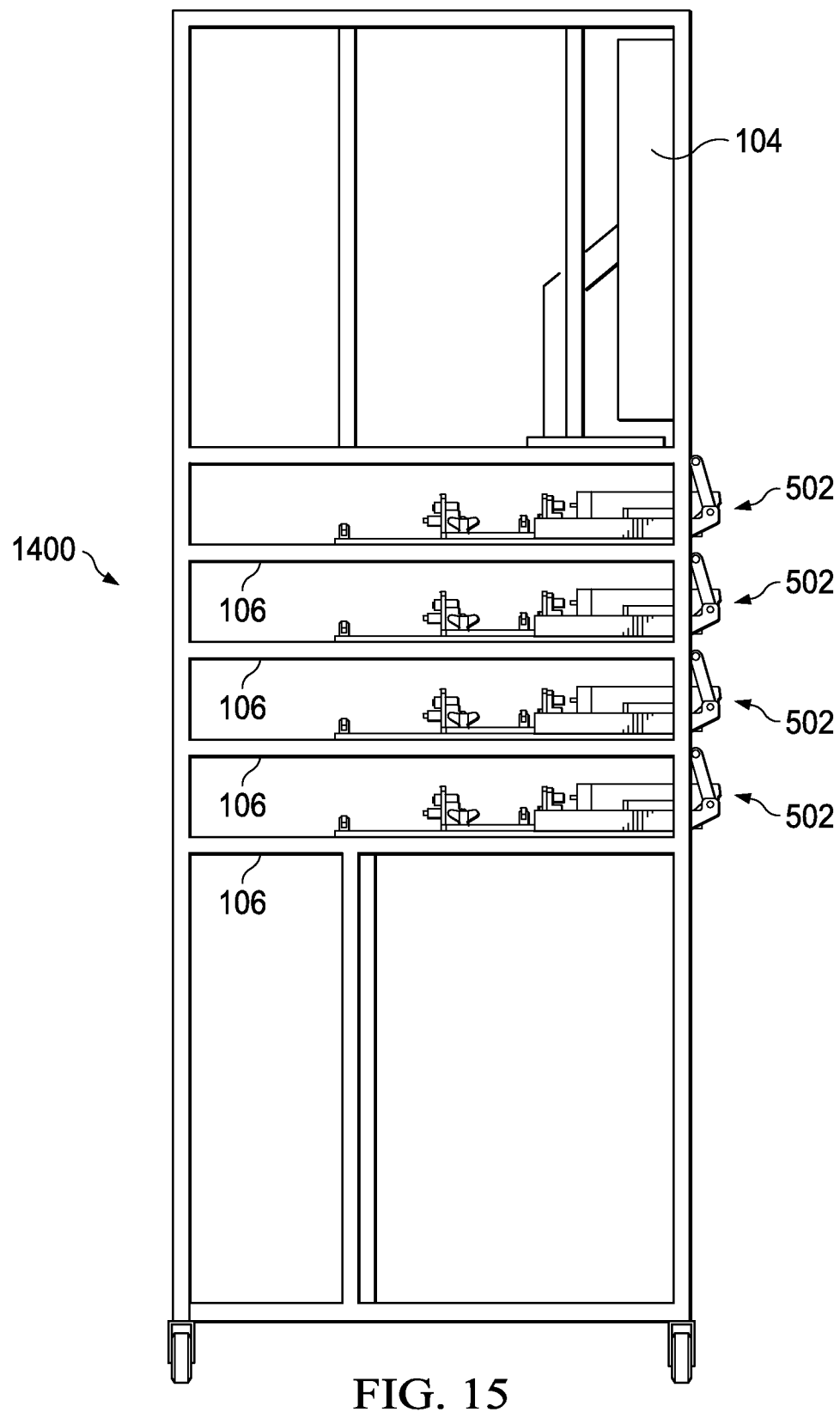
FIG. 15 is a pictorial representation of a side view of the test fixture of FIG. 14 in accordance with an illustrative embodiment.
Figure 16:
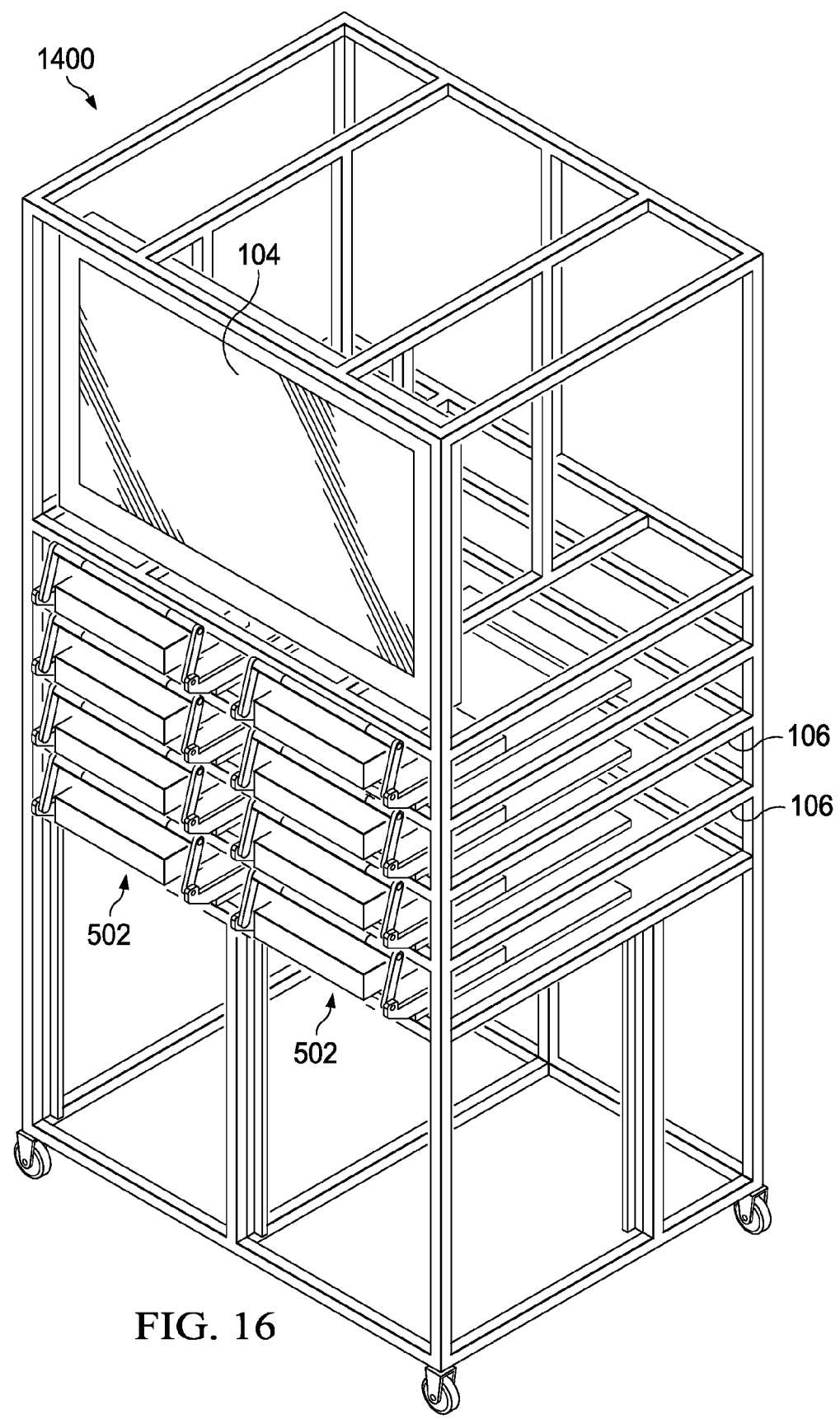
FIG. 16 is a pictorial representation of a perspective view of a the test fixture of FIG. 14 in accordance with an illustrative embodiment.

FIGS. 14-16 show additional embodiments of a test fixture 1400. In particular, FIGS. 14-16 show the framework of test fixture. Sizes and shapes of residential gateways will continue to change. The test fixture 1400 may be adapted to fit differently sized residential gateways. In addition, the framework of the test fixture 1400 may allow processing and analysis equipment, components, and modules of any number of shape and sizes to be integrated with, attached to, or connected to racks or columns of the test fixture 1400.

In one embodiment, multiple test fixtures 1400 may be connected or networked together. For example, utilizing a single display, multiple test fixtures may be connected to test any number of residential gateways from 1-24 or more. In another embodiment, the test fixture 1400 may be connected to a network so that from a single test fixture, computing device, or interface the user may coordinate testing an analysis of multiple test fixtures each connected to multiple residential gateways. As a result, testing efficiency may be further increased.

The test fixture 1400 may include headend equipment or simulators for testing cable, IPTV, or satellite residential gateways or other specialized equipment and software for testing gaming devices, DVRs and PVRs. The headend equipment may be utilized to duplicate a cable or satellite signal including formatting, encryption, modulation, and so forth fully testing residential gateways connected to the test fixture 1400.

Figure 17:
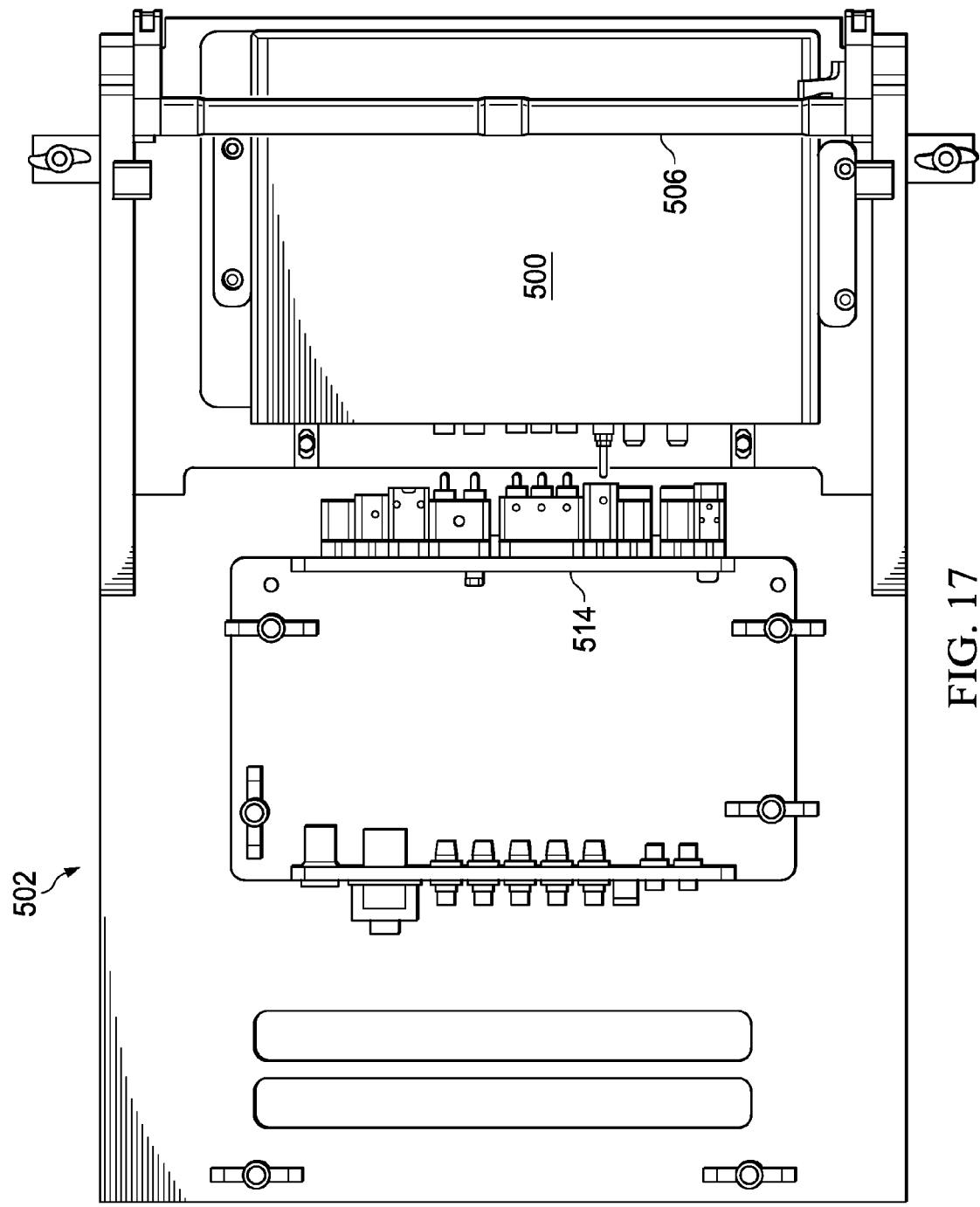
FIG. 17 is a pictorial representation of a top-view of a set-top box in a nested platform in accordance with an illustrative embodiment.

FIG. 17 is another embodiment of the nested platform 502 of FIGS. 5-8 and further illustrates the nested platform 502 (or sled) and the set-top box 500 before being connected. FIG. 17 illustrates the handle 506 in an unlocked or disengaged position (positioned vertically) which may change once the set-top box 500 is connected to the nested platform 402 (horizontal position) by the adapter module 514. Various portions of the nested platform 502 may be biased utilizing springs, elastomers, hydraulics or other components for connecting and disconnecting the set-top box 500 from the nested platform 502 and moving the handle 506.

The illustrative embodiments may be utilized as a testing platform for network devices, such as residential gateways, set-top boxes, modems, IPTV devices, and other similar electronic devices. The test devices may also be referred to as units under test. The test fixture, systems, and methods described for reducing the time, expense and instrumentation resources required to performing efficient testing, repairs, and CPI removal. In addition, disputes and miscommunication are minimized utilizing the universal fit of the test fixture in conjunction with repeatable configurations for similar residential gateways.

The test stations or fixtures may be utilized to test very-high-bitrate DSL (VDSL) residential gateways. The testing may be performed for prototype, new, used, refurbished, repaired, or replacement devices. In one embodiment, the test fixture may be utilized as part of a return merchandise authorization system. The testing criteria including settings, requirements, standards, protocols, and thresholds may be reconfigured for different makes and models of network devices. The test stations may be configured to maximize test throughput balanced against the need for test equipment utilization and man hours (number and time of users). The need for user involvement is greatly reduced as a single user may implement testing for a number of network devices. Other benefits may include the ability to perform parallel, simultaneous, sequential, or concurrent testing of network devices, flexible software architectures that may be updated to accommodate future test plans, the test slots and test fixture may be reconfigured for different input/output ports and other connectors. The mechanical and software configuration of the test fixture may be varied and reconfigured for the varying connectivity and testing requirements of distinct network devices.

In one embodiment, the test fixture may be composed of multiple functional components or blocks which may include multiple pieces of test equipment. In one embodiment, the test equipment provides the stimulus for exercising the required components of a network device, such as an IPTV DSL multimedia system. The functional components make include a headend both inside and outside the test station. The headend may provide connectivity to the various ports of the residential gateway. The tests may simulate multiple loop lengths as well as evaluate communications rates as are required for each network device (e.g., based on customer documentation). The tests may vary from 100 Mb-100 GbBase transmitting and receiving tests, Wi-Fi testing (e.g., 802.11n, 80211.(x), USB testing and so forth. Test scripts, limits, thresholds, criteria, and factors (testing information) may be stored in a database within or accessible by the test fixture. The applicable testing information may be accessed based on an identifier, such as make, model, firmware or software version, or so forth. The test results may be stored in a database or communicated for storage to any number of other networked computing or communications devices.

Figure 18A:
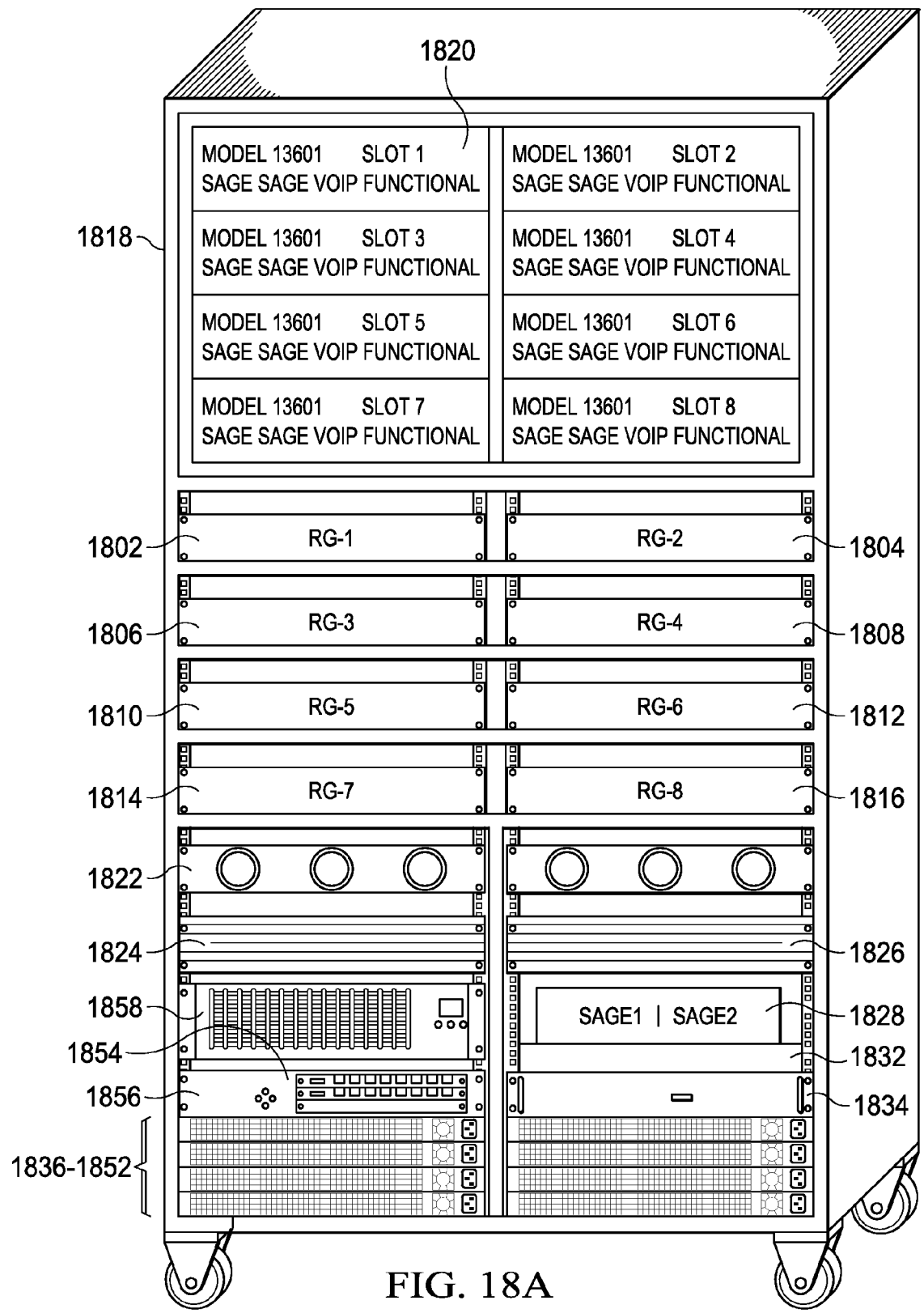
FIGS. 18A-B are pictorial representations of a test fixture 1800 in accordance with an illustrative embodiment.
Figure 18B:
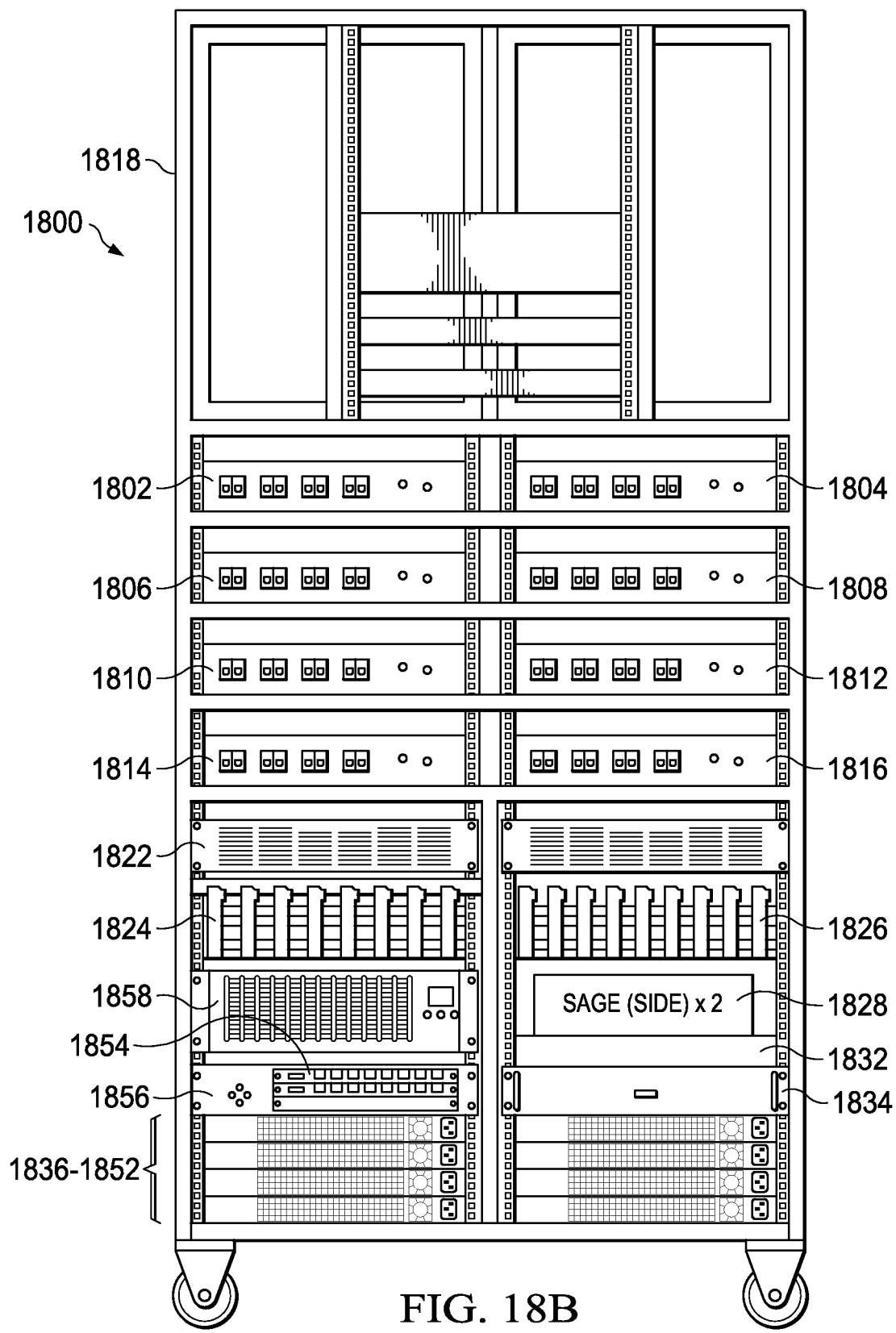

FIGS. 18A-B are pictorial representations of a test fixture 1800 in accordance with an illustrative embodiment. The test fixture 1800 of FIG. 18 may be configured for testing residential gateways 1802-1816. The test fixture 1800 may include a frame 1818 for supporting the different components, devices, test equipment, and systems. In one embodiment, the frame 181 is a test rack. The frame 1818 may include space for adding additional test equipment and devices based on the needs. In one embodiment, each of the nested platforms or testing slots associated with the residential gateways 1802-1816 is radio frequency shielded for performing the tests. For example, the nested platforms may include a clamshell configuration for enclosing the residential gateways 1802-1816 to prevent unwanted RF signals from interfering. The test fixture 1800 may be configured to communicate utilizing any number wired (e.g., CATV) of wireless local area networks (e.g., 802.11n, etc.) including evolving standards and protocols.

The test fixture 1800 may remove the time consuming need to individually connect each unit under test. The test fixture 1800 may allow for network devices to be rapidly loaded and tested. For example, the time to physically connect the unit under test, multiple devices may be scanned, loaded, and tested utilized the design of the test fixture 1800.

In one embodiment, the test fixture 1800 may include a display 1820, a fan 1822, patch panels 1824 and 1826, multi-channel test units 1828 and 1830, Ethernet switch 1832, executive PC 1834, computers 1836-1852 (e.g., eight computing devices), line cards 1854, wireline simulator module 1856, and multiplexer 1858.

The components of the test fixture 1800 may be connected utilizing any number of cables (Ethernet, coax, twisted pair), lines, splitters, filters, wires, traces, cards, adapters, wireless connections or so forth. The described components represent intelligent service managers, wireline simulators, line cards, amplifiers, diplexers, fixtures, connectors, ports, connection panels, computers, servers, transceivers, and other hardware, firmware, and software interfaces.

The display 1820 may be a monitor (e.g., OLED), screen, touch screen, television, or other display component. The display 1820 may display the graphical user interface of the testing application and a menu for operating the test fixture 1800. The display 1820 may include information for testing and calibrating the components, functional blocks, and entire test fixture 1800.

The test fixture 1800 may include the executive PC 1834 for managing the hardware and software through the various connections including cabling to the wireline simulator modules 1856. The executive PC provides the host computer platform for executing the testing application including test sequences as well as providing and managing connectivity and supervisory control of the other functional components of the test fixture. The executive PC provides the graphical user interface for operating the test fixture 1800. The multi-channel test units 1828 and 1830 may be configured to perform VoIP testing as well as HPNA testing. For example, many residential gateways 1802-1816 and associated test slots include ports requiring the adapter of the test slot to connect to a VDSL connection and an Ethernet connection. The wireline simulator module 1856 includes port for simulating signals across wire lines.

In one embodiment, the wireline simulator module 1856 is a piece of equipment used to simulate the frequency response and propagation delay of a single, twisted pair from a network device to the local video ready access device (VRAD) which may include the electronics needed to communicate to and from the network device. The wireline simulator module 1856 has the ability to simulate Up/Downstream rate (how much bandwidth) versus reach (distance from residents) to determine VRAD line degradation by attenuation, in order to determine if the network device being tested meets required standards for losses per distance.

Although not shown, the test fixture 1800 may also include a scanner for scanning identifiers, such as bar codes of the residential gateways 1802-1816 and the associated test slots. The switches, multiplexers, ports, and connection panels of the test fixture 1800 allow the test equipment to be shared and for tests to be run simultaneously. For example, the multiplexer 1858 may switch the plain old telephone system (POTs) and VoIP ports to the multi-channel test units 1828 and 1830, HPNA, and VDSL headend equipment.

The test fixture 1800 includes various RF network interface components for testing the wireless functionality of the residential gateways 1802-1816. The test fixture 1800 utilizes an executive PC 1834 (a control computer), wireless adapter, and antenna to verify correct operation and performance of the wireless capabilities of the network device to ensure that the expected values are returned.

Figure 19:
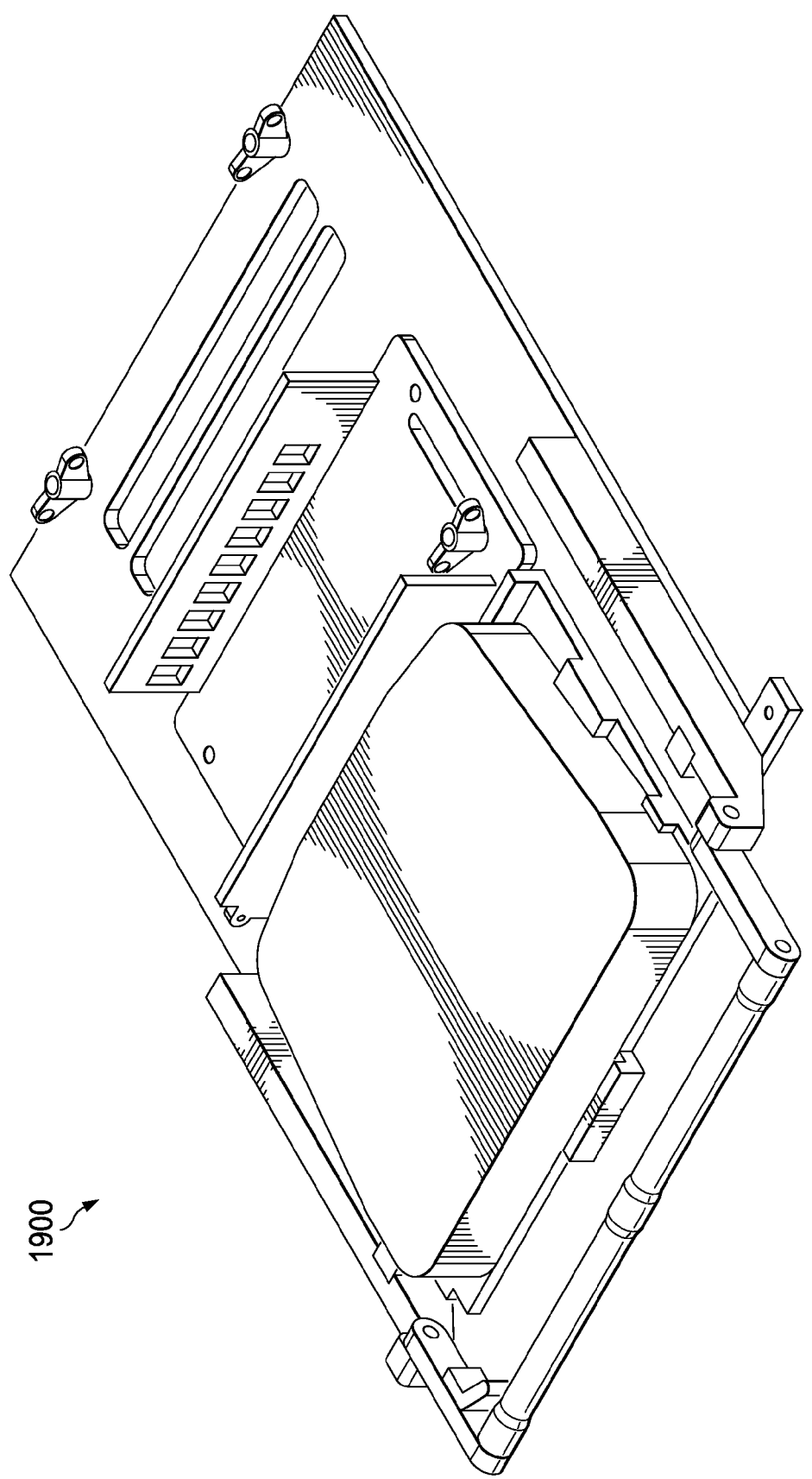
FIG. 19 is a pictorial representation a set-top box in a residential gateway in accordance with an illustrative embodiment.

FIG. 19 is a pictorial representation of a test slot for a residential gateway in accordance with an illustrative embodiment. The test slot 1900 may be substantially similar to the nested platform 502 of FIG. 5.

Figure 20:
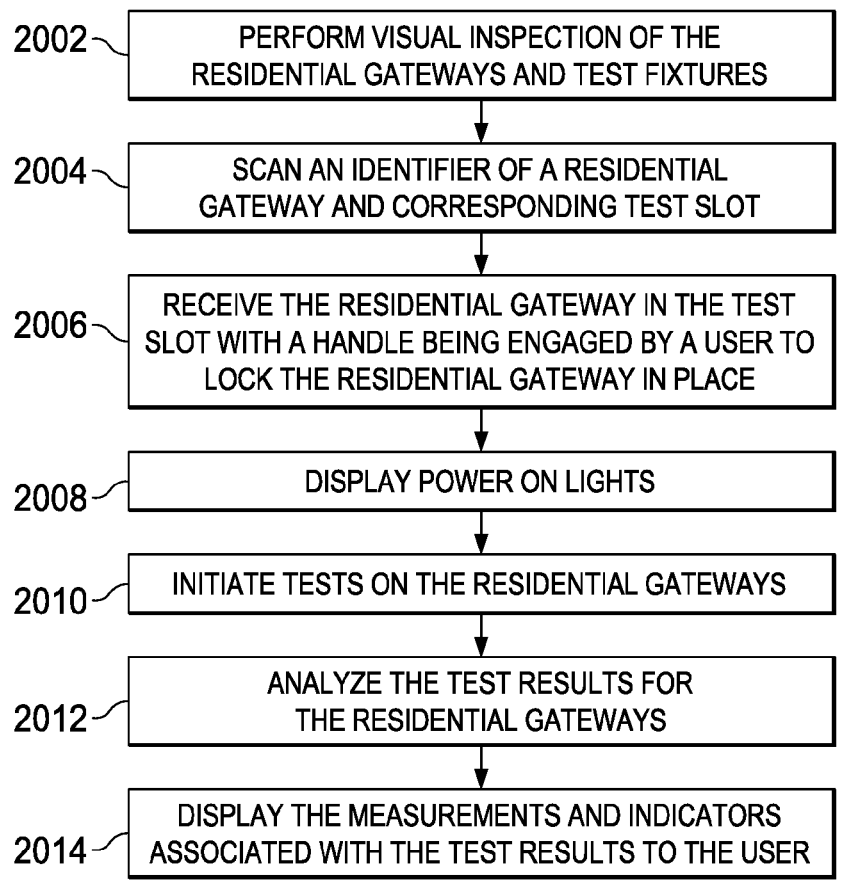
FIG. 20 is a flowchart of a process for testing a residential gateway in accordance with an illustrative embodiment.

FIG. 20 is a flowchart of a process for testing a residential gateway in accordance with an illustrative embodiment. In one embodiment, the process of FIG. 20 may be implemented by a test fixture configured to test residential gateways, modems, routers, or other network devices. The process may be performed automatically or with minimal user input. In one embodiment, the test fixture may have eight test slots or fixtures.

In one embodiment, the test fixture may be turned on or automatically activated to perform testing. For example, the test fixture may include a power switch activating the various systems and components of the test fixture. In another embodiment, a user interface and computing component (e.g., desktop personal computer) of the test fixture may include an icon or shortcut that is activated enabling a residential gateway test application. The test application may display information indicating the type of network device that the test fixture is configured to test. For example, the test application may indicate that residential gateways of a particular make and model are being tested. The test application may also display individual status information and results for each of the network devices (see FIG. 21). If the testing application fails to start, and automatic notification, such as an error message, e-mail, or other indicator may be displayed or sent. The testing application may also display errors, failures, or other relevant information at any time during the process of FIG. 20. In one embodiment, the test fixture may include an integrated or external display for displaying information, errors, and results to the user.

In one embodiment, the process may begin by performing a visual inspection of the residential gateways and test fixtures (step 2002). The test fixture may include one or more cameras for visually inspecting the exterior surface and components, such as power supply port, cable interface, indicators (e.g., power LED), communications or computing ports (e.g., USB, Firewire, DSL, ONT, Ethernet, phone line, etc.), and so forth. The visual inspection may also include analysis and review of the components of each of the test fixtures. The images (e.g., standard, thermal, infrared, etc.) or video may be compared against a standard or default image to ensure proper functionality. In another embodiment, the process of step 2002 may be performed by a user prior to insertion of a number of residential gateways within the test fixture.

Next, the test fixture scans an identifier of a residential gateway and a corresponding test slot (step 2004). The scan may be utilized to retrieve or determine a serial number, model identification, firmware, and so forth. In one embodiment, the scan is of a serial number or barcode associated with the residential gateway and the test slot, respectively. However, the indicators may be any form of identification including text, RFID tags, labels, QR codes, or other known identifiers. In one embodiment, step 2004 may be performed automatically in response to the residential gateway being inserted into the test lot in a predefined orientation and position. The text fixture may include a wired or wireless scanner for performing the standing of step 2004 based on user actions.

Next, the test fixture receives the residential gateway in the test slot with a handle being engaged by a user to lock the residential gateway in place (2006). In one embodiment, the handle of the test lot may be positioned in an up or unlocked position prior to engaging the residential gateway. The user may slowly and gently push or pull the handle down to engage the ports of the residential gateway with the adapters of the test lot of the test fixture. The handle may be in a down or locked position once engaged by the user. In another embodiment a robotic arm may position each of the residential gateways and the handles may include motors, levers or other engagement components for securing the residential gateways within the corresponding test slots. If the handle is unable to be moved to the down or locked position, an alert, message, or other indicator may be displayed to the user or a technical service.

Next, the test fixture and connected residential gateway display power on lights (step 2008). In one embodiment, proper nesting or docking of the residential gateway a result in one or more of a power on light of the residential gateway being activated, an LED of the test fixture being displayed, or other text message or icon the testing application being activated. For example, a section of the testing application may indicate "Boot-up Test" for the associated test slot.

The process of steps 2002-2008 may be performed a number of times until the test fixture is fully loaded or unloaded to the user's satisfaction. Once the test fixture is loaded with the desired number of residential gateways, the test fixture initiates test on the residential gateways (step 2010). The tests may include boot up tests, VoIP tests, VDSL tests, HPNA tests, wireless tests, Ethernet tests, USB tests, and FW download tests.

Next, the test fixture analyzes the test results for the residential gateways (step 2012). The analysis may include determining whether each of the residential gateways passed or failed each individual test.

The test fixture displays measurements and indicators associated with the test results to the user (step 2014). The testing application may utilize colored boxes, checkmarks, text, or other icons to indicate whether each of the tests was passed by the corresponding residential gateway. For example, a green check may indicate that the residential gateway passed a particular test, a red X may indicate that the residential gateway failed a particular test, and an orange exclamation point may indicate that there was an error and that technical services may need to be notified. During step 2014, the results of the testing may be stored locally in a database or memory of the test fixture or communicated to an external computer, database, or other device. The results may indicate whether the respective residential gateways passed or failed each of the tests and may be associated with the identifier.

Once the testing is fully performed, the residential gateways may be removed by slowly lifting on the handle corresponding to each of the test slots to unlock the residential gateway from the test fixture. In one embodiment, the test fixture may associate an electronic failure label in a database, memory, or other system for preventing the residential gateway from being returned to service in response to one or more failures. The test fixture may also apply a paper or physical label to the failed the residential gateway or the user may be instructed to perform such an action. In one embodiment, a user may be required to enter verification that a failure label has been applied before unlocking other features and aspects of the test fixture.

Figure 21:
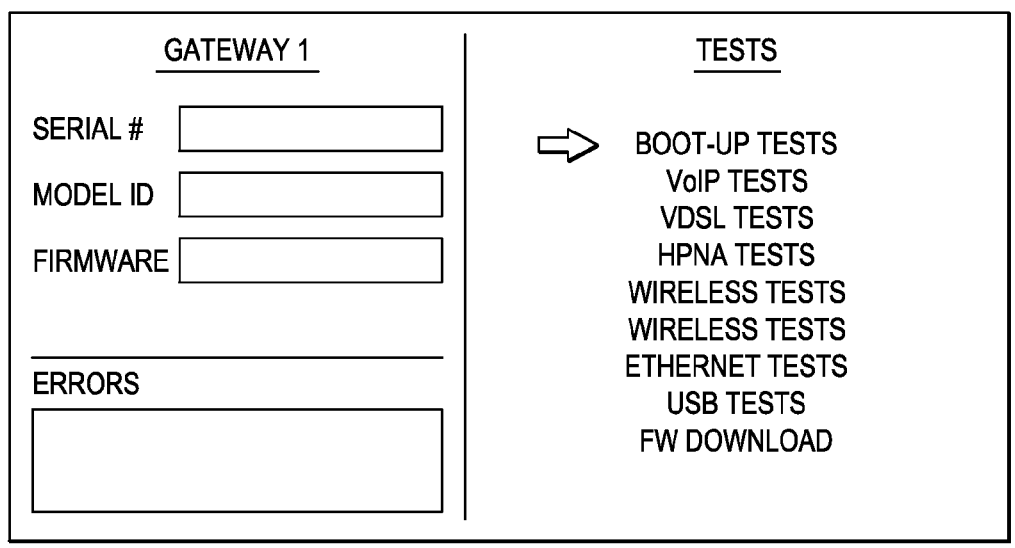
FIG. 21 is a pictorial representation of a graphical user interface for testing in accordance with an illustrative embodiment.

FIG. 21 is a pictorial representation of a graphical user interface 2100 for testing in accordance with an illustrative embodiment. The graphical user interface 2100 is representative of a number of graphical components, such as windows, screens or graphical segments that may be utilized to present and receive information from the user. The graphical user interface 2100 may include any number of indicators or information. For example, the graphical user interface 2100 may identify the associated residential gateway or network device with a label or other identifier, such as "Gateway 1". The graphical user interface 2100 may also indicate device information, such as serial number, model identification, firmware, and any noted errors.

Although not shown, the graphical user interface 2100 may also verify that the user is authorized to utilize the test fixture. For example, a user login or system password may be required to perform testing of the network devices. The graphical user interface 2100 may also be utilized to receive a wireless network name and key. The graphical user interface 2100 may also provide the user step-by-step instructions utilizing the test fixture. For example, the graphical user interface 2100 may provide instructions for installing the network device in the test slot of the test fixture, scanning barcodes associated with the network device and test slot to initiate testing, powering up and controlling the test fixture and network device. The test fixture may automatically perform tests or may implement tests based on user input, commands, or instructions.

The graphical user interface 2100 may also graphically indicate the results of testing as a summary, in real-time, or for all test results. In one embodiment, the graphical user interface 2100 may indicate whether each of the tests is pending, being performed, passed, failed, or whether there are errors. Any number of different fonts, icons, colors (e.g., green, red, yellow etc.), or other data or information may be utilized to present the information to the user. In one embodiment, the test fixture may also include LEDs or other hardware indicators (or software) for similarly displaying the information.

In other embodiments, the graphical user interface 2100 may be utilized to power up the network device to minimize initial wireless (e.g., Wi-Fi) broadcasts during wireless testing of other devices. The graphical user interface 2100 may also provision the network device for utilization with a test network. User input received may allow the test fixture to switch between rate and reach testing (e.g., bandwidth and attenuation/distance). The graphical user interface 2100 may also control switching between VoIP and POTS lines for performing HPNA and TP connection testing.

In other embodiments, the testing stations herein described may be configured for testing network devices with wireless components and functionality. For example, the wireless network devices may be configured to communicate directly or indirectly with a network or other devices during utilization. The network may utilize a communication standard, such as 802.11_(e.g., 802.11n) or the most recent WiFi standards. The direct or indirect communications may also represent Bluetooth, ZigBee, wireless local area network (WLAN) communications, cellular signals, infrared, WiMAX, proprietary standards, or other radio frequency signals whether analog or digital that may be utilized to communicate audio, video, media, packet, or control signals. Any number of FCC, FDA, IEEE, ISO, CEN, ETSI, ARIB, ANSI, or IEC approved communications protocols or standards may also be transmitted by the transceiver of the wireless network device. Indeed, the types of wireless or wired standards or methods of communication are numerous. For example, the network device may communicate directly or indirectly with other network devices, remote controls, set-top boxes, routers, tablets, cell phone, e-readers, mp3 players, playback devices, media systems, desktop computers, laptops, appliances, wireless devices, and so forth.

As a result, the test station may include electromagnetic interference (EMI) shield screens, covers, Wi-Fi chambers, or other similar devices or structures for performing simultaneous wireless testing of wireless network devices. The test chambers may include a base, side walls, a back, and a retractable or opening portion or cover for inserting and removing the network device for testing. The materials of the test chamber may prevent the infrared and wireless signals from reflecting or escaping and interfering with the test station, associated test equipment, network devices under test, or other nearby devices, systems, or equipment. For example, any number of wireless or network devices may be tested simultaneously or concurrently without the signals interfering with the testing equipment, processes, or other wireless network devices under test.

The test station may also have the capability of being reconfigured via software to switch from testing one set of network devices to another. For example, the user may utilize a graphical user interface to select makes and models of network devices and the test station may reconfigure itself to perform the necessary tests. As a result, the flexibility and value provided by the test station is increased. The user may also more easily switch between different network devices based on unforeseeable needs and demands for testing.

The test station may also be configured to connect a power supply to the test station so that the associated power supply is utilized and tested during testing of the associated network device. For example, the power supply that is or will be shipped with the network device may be utilized to power the network device during testing. As a result, the testing may further verify accessories that are shipped with the network device providing additional assurances regarding functionality and operability of network devices and systems shipped to individual users. The testing may be particularly useful for new, returned, used, or refurbished network devices.

Figure 22:
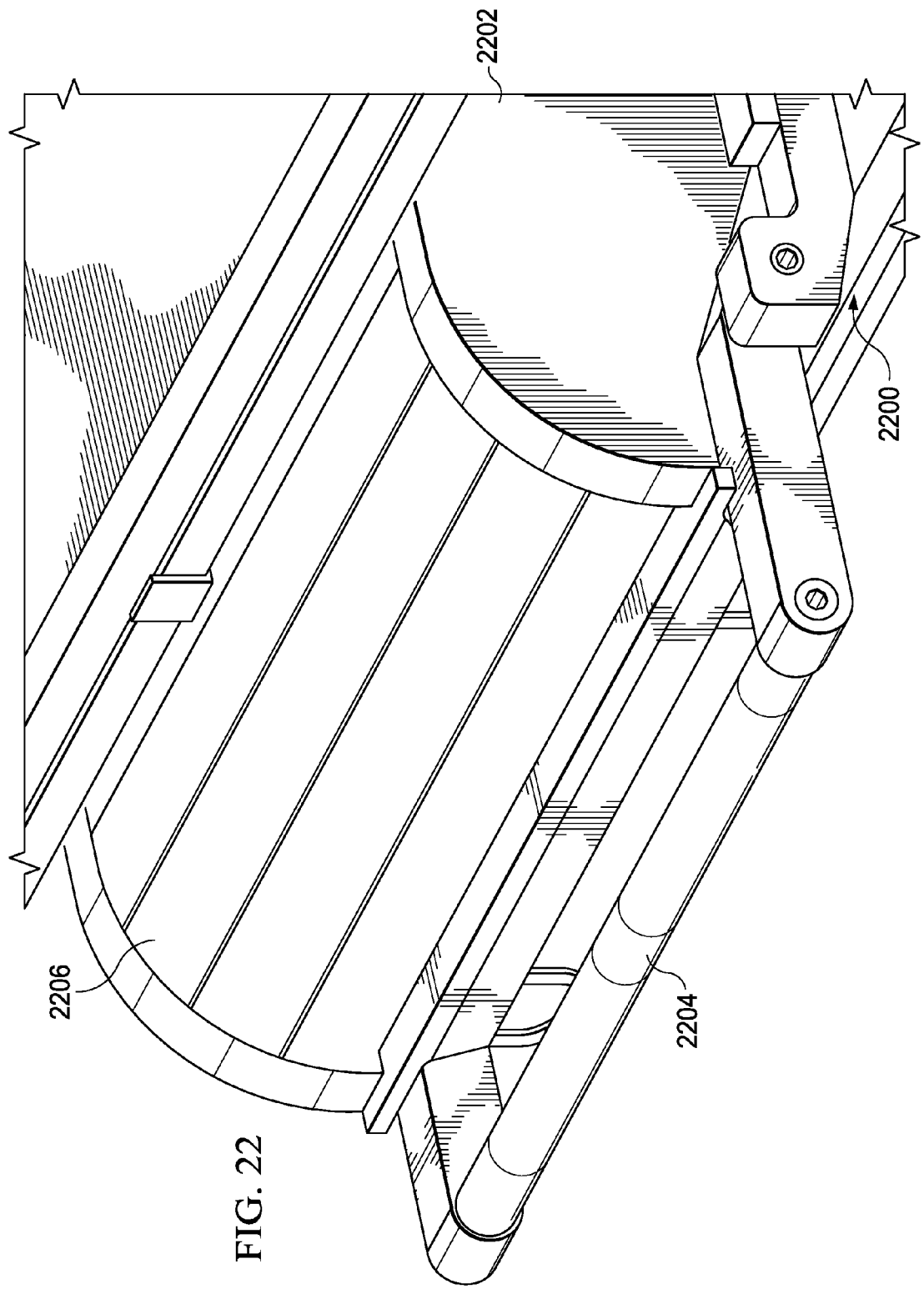
FIGS. 22-25 are pictorial representation of a test station configured for testing wireless network devices in accordance with an illustrative embodiment.
Figure 23:
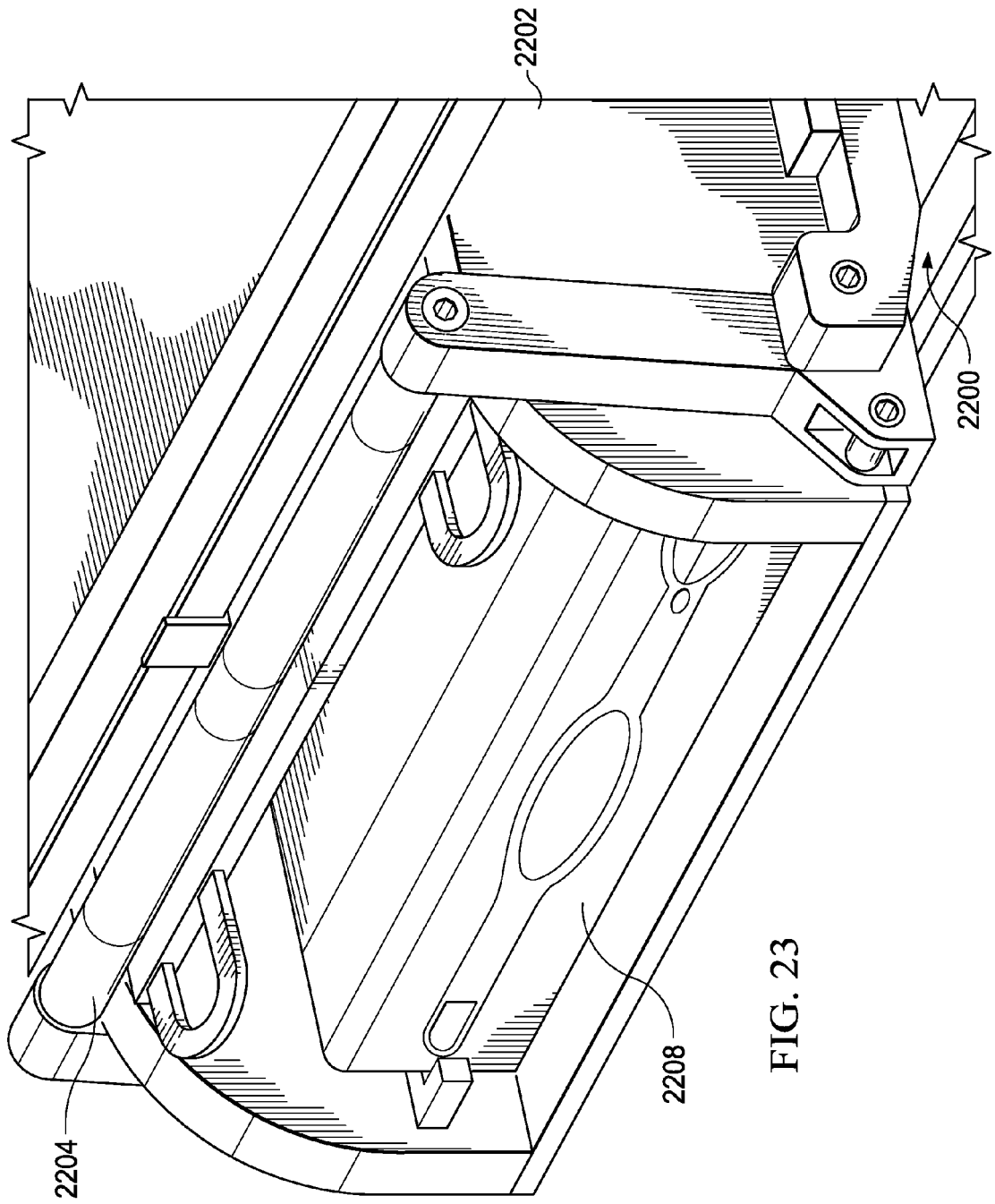

Referring now to FIGS. 22-25 showing pictorial representations of a test station 2200 configured for testing wireless network devices in accordance with an illustrative embodiment. The test station 2200 may include a number of test chambers 2202. The test chambers 2202 are isolation receptacles or structures defined by the test station 2200 for performing testing of the applicable devices. As subsequently described, the test chambers 2202 may represent an integrated portion of the test station 2200 or stand-alone devices. In one embodiment, the test chambers 2202 may be inserted or removed from the test station for external use. In one embodiment, the test chambers 2202 may include a handle(s) 2204 and a cover(s) 2206. FIG. 22 shows the test chamber 2202 with the cover 2206 closed and with the handle 2204 in a locked position for performing testing. FIG. 23 shows the test chamber 2202 in an open position with the handle 2204 raised up for inserting or removing network device(s) 2208. In one embodiment, the handle 2204 and the cover 2206 may be locked in an open or closed position corresponding to an access/loading mode and a testing mode. The network device 2208 is representative of any electronic device that may be tested within the test chamber 2202. In one embodiment, the network device 2208 is a wireless network device that is being shielded within the test chamber for testing by the test station 2200 and associated testing equipment as are herein described.

In one embodiment, the cover 2206 is a hinged cover, slidable cover, door, enclosure, or shielding hood that encloses the network device 2208 during testing. For example, the cover 2206 may be aluminum slats with felt secured in between to absorb infrared and wireless signals (e.g., WiFi). Each of the slats of the cover 2206 may be rotationally attached to each other by a hinge or other pivot. The cover 2206 may prevent disruption or interference between test chambers 2202 of the test station 2200. The cover 2206 may be formed of metal, plastic, composites or other materials suitable for preventing wireless signals from escaping. For example, each of the test chambers 2202 may be lined with at least a reflective wire mesh and an absorption mesh layer configured to reflect and attenuate (e.g., to 6 GHz) signals outside of and within the chamber. The cover 2206 may also include embedded, internal or external wires, structures, or composites for preventing entry or escape of wireless signals.

In one embodiment, the test chambers 2202 may include a wireless transceiver (not shown) for broadcasting and receiving wireless signals to and from the network device 2208. The wireless transceiver may be configured for infrared, Wi-Fi, Bluetooth, or other communications standards and protocols utilized by the network device 2208. The wireless transceiver may be positioned for optimal testing. For example, the wireless transceiver may be positioned near an infrared receiver of the network device 2208, if applicable. In one embodiment, the wireless transceiver may include an infrared emitter or radio frequency transmitter and receiver that is attached to the inside of the cover 2206 for performing infrared testing of the network device 2208. The infrared emitter may move up and down as the cover 2206 is extended or retracted. The wireless transceiver may also be connected to other portions of the test chambers 2202 or adapters or interfaces positioned within the test chambers 2202.

The test chamber 2202 may maintain an isolated chamber in which internal wireless signals are reflected only within the test chamber 2202 to prevent interference with other tests, systems, or devices. Likewise, the test chamber 2202 may prevent external wireless signals from entering the test chamber 2202 during testing to prevent unwanted interference. As a result, a user may insert electronic devices, close the cover 2206, and perform various testing tasks without unwanted interference. The test chamber 2202 may then be opened to retrieve the electronic device or devices. For example, the test chamber 2202 may be utilized for any number of cell phones, residential gateways, set-top boxes, gaming devices, media devices, computing devices, and so forth. In one embodiment, remote control testers and other testing systems that are incorporated by reference may be utilized with or as part of the test station 2200.

The test chamber 2202 may also be empty except for anchors, rails, threaded ports, or other connectors for receiving testing equipment and implementing testing and connection processes as are described in patent application Ser. Nos. 12/613,293 and 12/613,324 entitled RF TEST FIXTURE AND METHOD FOR SECURING A WIRELESS DEVICE FOR RF TESTING and MULTIDIMENSIONAL RF TEST FIXTURE AND METHOD FOR SECURING A WIRELESS DEVICE FOR RF TESTING which are hereby incorporated by reference in their entirety. For example, the test chambers 2202 may be utilized for wired or wireless testing that may require physical connections to the network device 2208 or a power only connection and wireless connection to the network device 2208.

In one embodiment, the cover 2206 may extended or retracted at any time. For example, the cover 2206 may be retracted to access the network device 2208 for button testing. The cover 2206 may also be retracted for implementing testing utilizing a remote control controlled by a user or automatically by a system, components (e.g., a remote control nest connected to an elevator for testing each of the network devices where the buttons or controls of the remote control are activated by a moveable plunger), or devices as is taught by patent application Ser. No. 13/741,850 entitled SYSTEM AND METHOD FOR A REMOTE CONTROL TESTER that is hereby incorporated by reference in its entirety. A remote control testing system may also be utilized within the test chamber 2202. In another embodiment, the cover 2206 may include a handle, grip, or other structure for extending and retracting the cover 2206. The test chamber 2202 and cover 2206 may be configured to reflect or absorb wireless signals from the network device 2208 without reflection to other network devices or testing equipment. All the infrared and wireless signals are contained within the test chamber 2202 without affecting the other wireless network devices under test in the test station 2200.

The cover 2206 may also be locked in place when the handle 2204 is lowered into a closed or locked position. For example, a latch or other securing mechanism (not shown) may be released to retract the cover 2206. The cover 2206 may also be locked if another cover is determined to be opened for testing. Alternatively, an alert may be displayed, output, or communicated indicating that multiple covers are open.

In another embodiment, the test station 2200 may include a locking mechanism for locking the network device 2208 in place during testing or during loading. For example, the test station 2200 may include one or more guards, buffers, or other components for securing the test station 2200 in place. In one embodiment, locking arms may be lowered, extended, rotated, or swung into place for securing the network device 2208.

Figure 24:
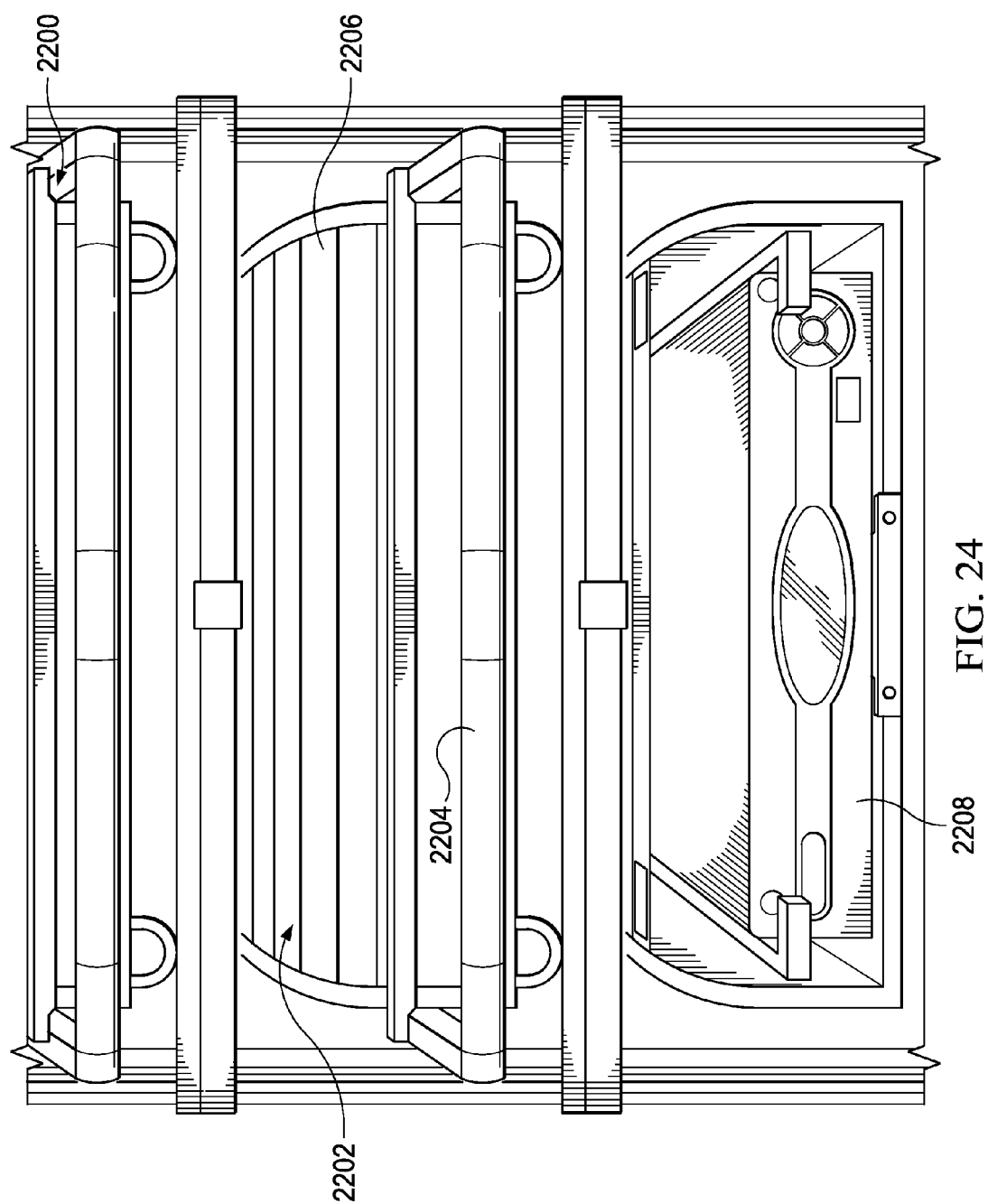

FIG. 24 illustrates a front view of the test station 2200 and the test chambers 2202 in accordance with illustrative embodiments. FIG. 24 illustrates how each of the test chambers 2202 may be opened. For example, the test chambers 2202 may be opened one at a time to access buttons, switches, or control components on the network device 2208 or perform wireless testing with devices or test equipment, such as infrared remote controls, wireless access points, or so forth. The test station and handle 2204 may also be connected to a motorized system and controls for automatically opening and closing the cover 2206 to perform testing.

Figure 25:
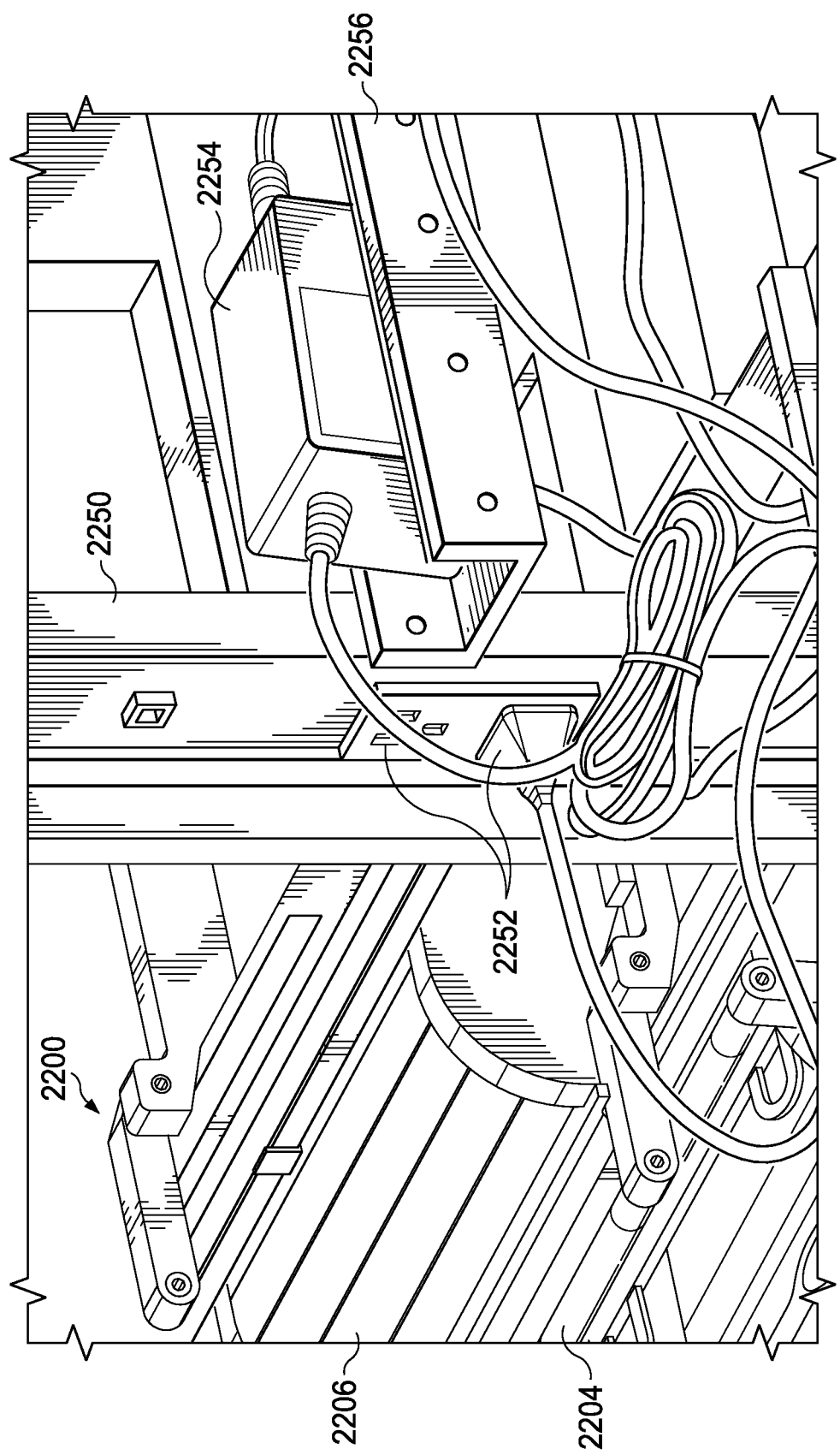

FIG. 25 is a pictorial representation of a test station 2200 configured for full testing of a wireless network device and accessories. In one embodiment, the test station 2200 may include a power strip 2250 with plugs 2252 for full testing of power supplies 2254. The test station 2200 may also include supports 2256 for supporting each of the power supplies 2254. As previously described, embodiments of the test station 2200 may include an internal power source and plug for powering individual network devices when inserted in the test station 2200 for testing.

In one embodiment, the supports 2256 may be curved, cupped, or U-shaped or otherwise include a receptacle for securing the power supplies 2254 during testing. The supports 2256 may be connected to the power supplies 2254 or the frame of the test station 2200. The test station 2200 may include enough plugs 2252 and supports 2256 for each of the network devices 2208 under test at one time.

The power strip 2250 may be powered by a stable power supply (not shown). In another embodiment, the power strip 2250 and associated power components may include any of the devices, components, or functionality described in application Ser. No. 13/592,643 entitled EXTENDED SYSTEMS AND METHODS FOR TESTING POWER SUPPLIES which is hereby incorporated by reference in its entirety.

In one embodiment, the test station 2200 may include a port (not shown) for receiving the plug end of the power supply 2254. The port may be connected to the adapter/interface components of the test station for powering the network device 2208 during testing. In another embodiment, the power supply 2254 may be connected directly to the network device 2208.

In another embodiment, the test chambers 2202 may include a receptacle, slot, or guide for inserting the cable of the power supplies 2254 and the plug end for direct connection to the network device 2208. The port may be configured to prevent radio frequency leakage into or out of the test chambers 2202. As a result, each of the power supplies 2254 may be connected to the associated network device. The power port may be an integrated portion of an adapter or interface for the associated electronic device.

The test station 2200 may be useful for testing new or used network devices. For example, network devices and the associated power supply may be tested together to ensure functionality in more realistic conditions. In another embodiment, the test chamber 2202 or components of the test chamber 2202 may be implemented as portions of the stand-alone device that is subsequently described.

The test station 2200 may be controlled by a graphical user interface (GUI) accessible to the user. For example, an initialization (INI) file may be uploaded to test a particular make, model, and software version of a device. For example, an INI file may be utilized to perform WiFi and IR testing.

In one embodiment, cellular RF testing may require a separate chamber (see FIGS. 33-36 including WiFi couplers and antennas, cellular couplers and antennas, etc.) The test station 220 and associated test systems, equipment, and components may be utilized to test any number of frequency bands. For example, an R&S CMW500 test set may be utilized for testing cellular applications and functionalities of an electronic device.

Figure 26:
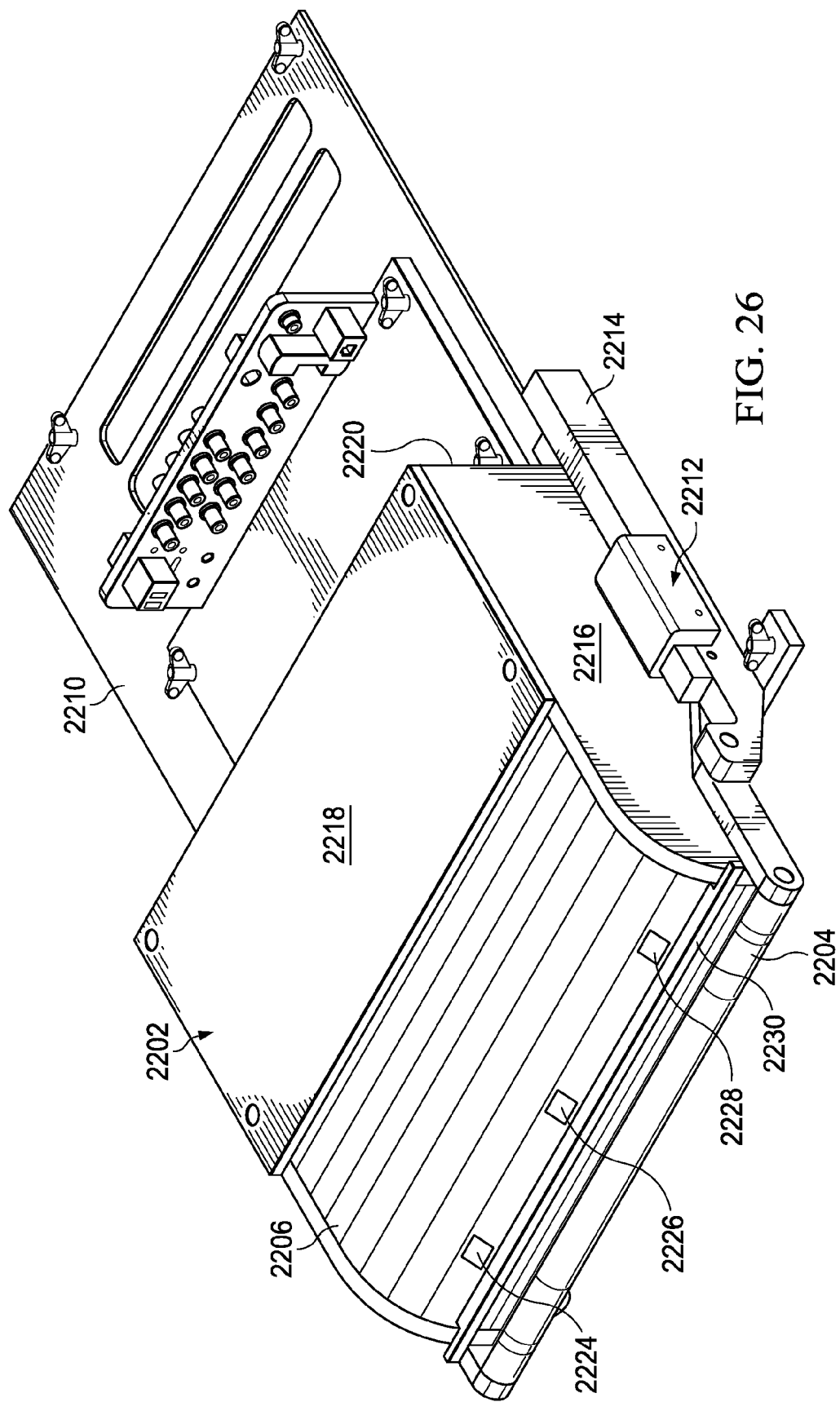
FIG. 26 is a pictorial representation of the test chamber in a closed position in accordance with an illustrative embodiment.
Figure 27:
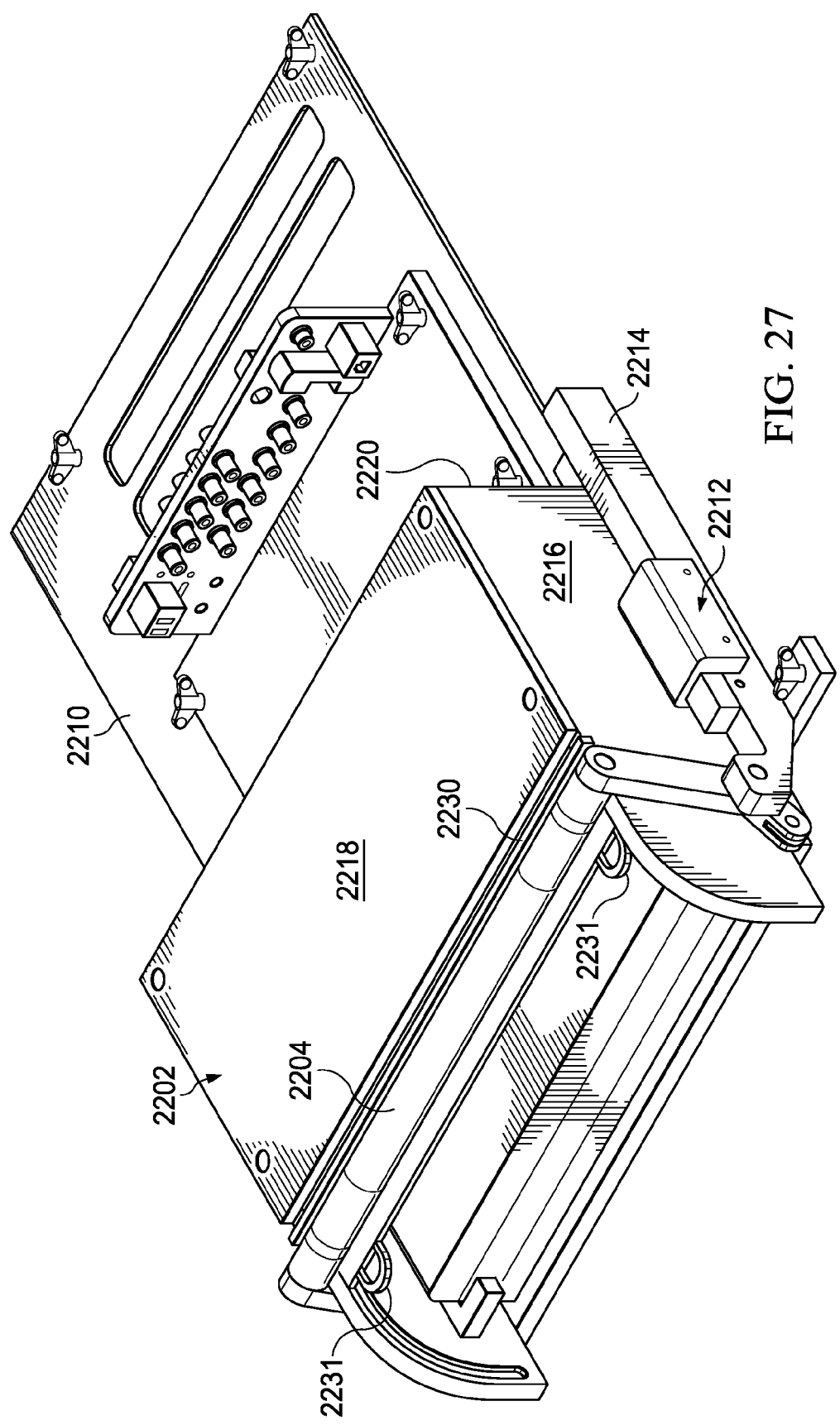
FIG. 27 is a pictorial representation of the test chamber in an open position in accordance with an illustrative embodiment.
Figure 28:
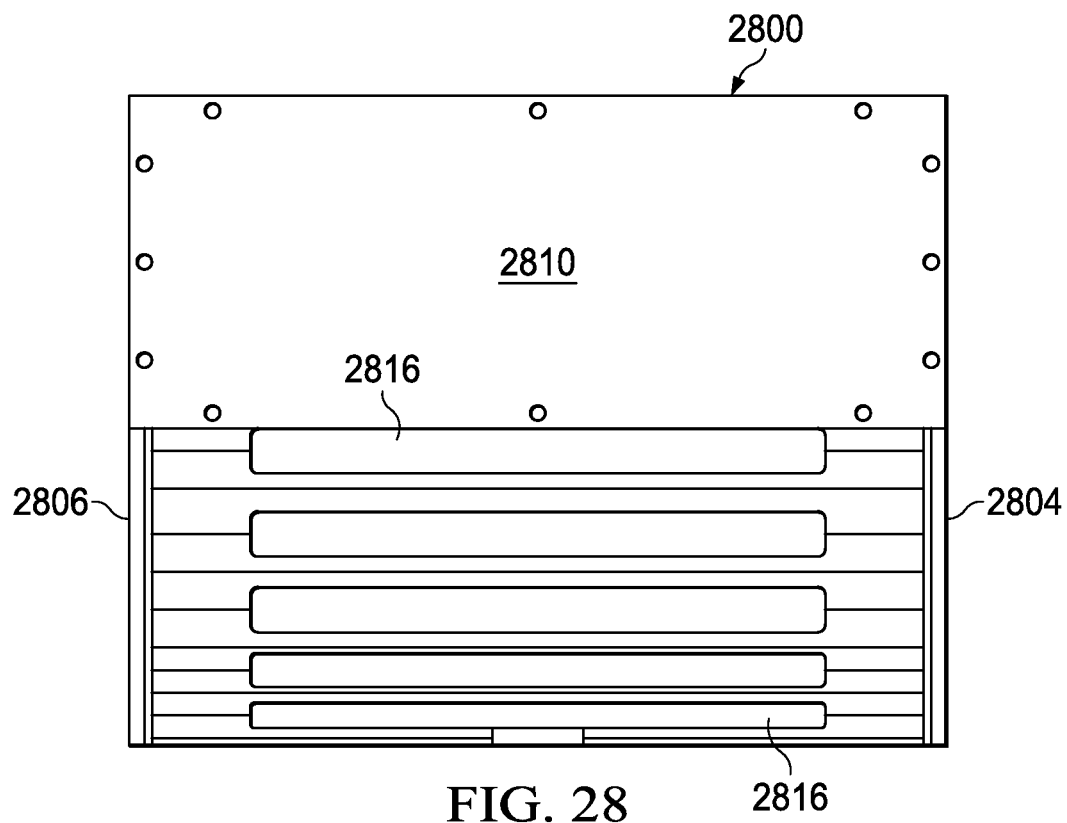
FIG. 28 is top view of another RF isolation chamber in accordance with an illustrative embodiment.
Figure 29:
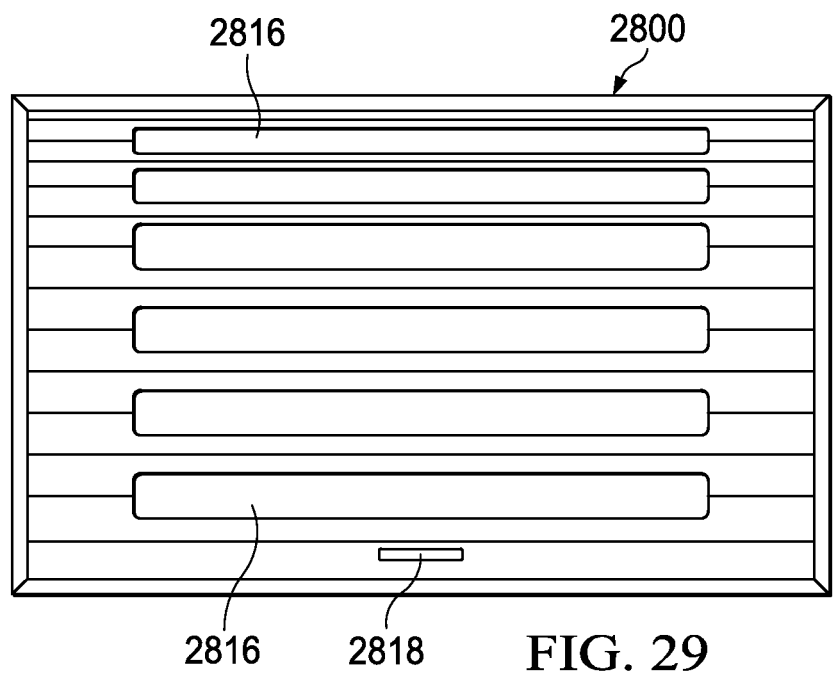
FIG. 29 is a front view of an RF isolation chamber in accordance with an illustrative embodiment.
Figure 30:
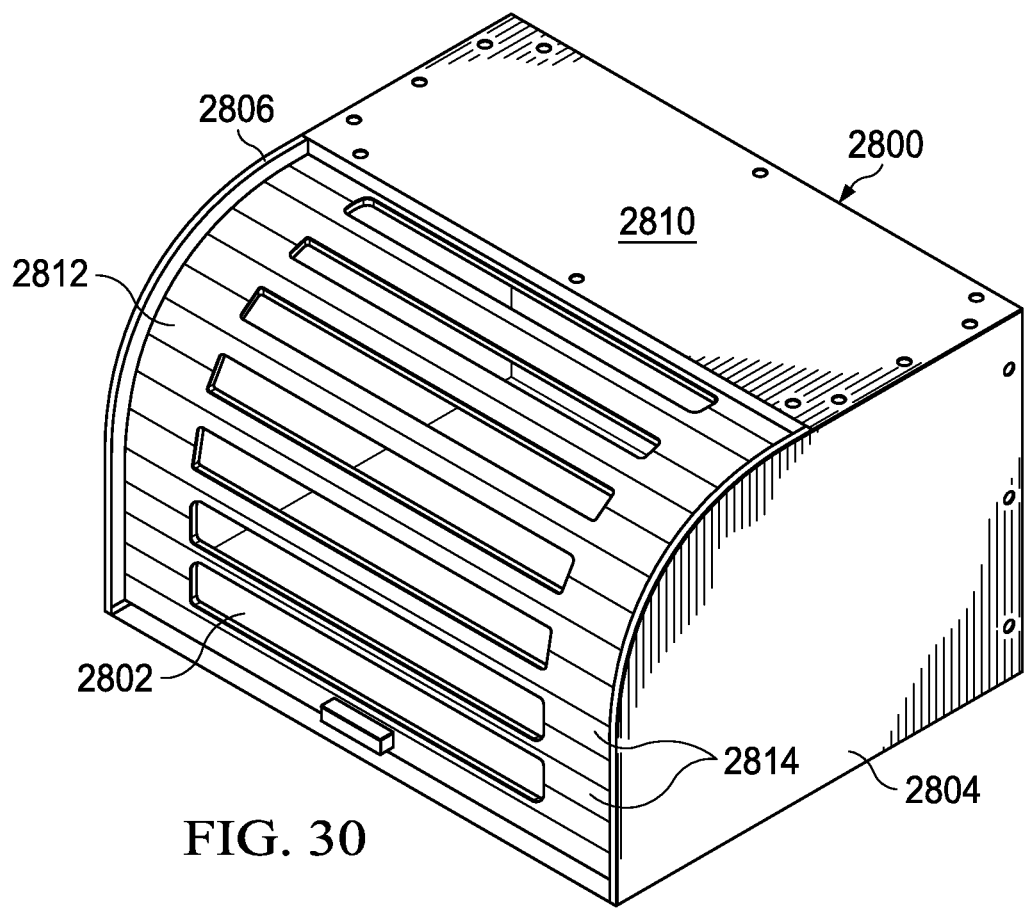
FIG. 30 is a perspective view of an RF isolation chamber in accordance with an illustrative embodiment.
Figure 31:
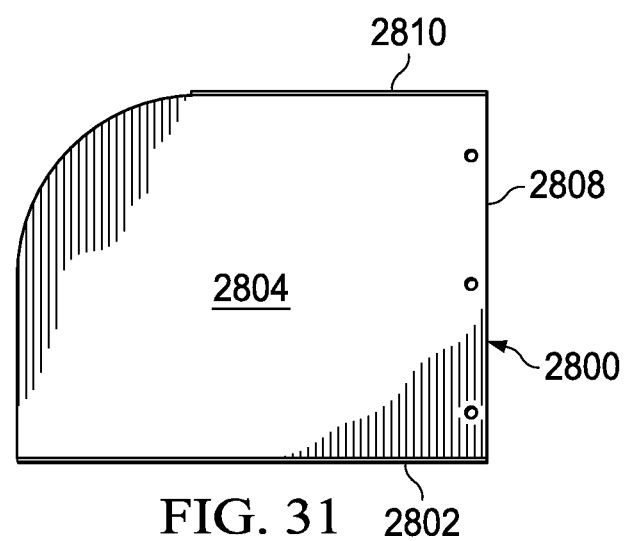
FIG. 31 is a side view of an RF isolation chamber in accordance with an illustrative embodiment.

Turning now to FIGS. 26 and 27 showings a pictorial representation of the test chamber 2202 in a closed position and in an opened position, respectively. The test chamber 2202 may be utilized as an IR chamber, an RF chamber, or both. The test chamber 2202 may be configured to attach to a base 2210 utilizing connectors 2212 that may attach to rails 2214 of the base 2210. In one embodiment, the rails 2214 are integrated with the base 2210. In another embodiment, the rails 2214 may be attached or connected to the base 2210 for receiving the test chamber 2202.

In other embodiments, the test chamber 2202 may be configured to be placed on a desktop, workstation, table, or other surface for implementing testing as may be needed. The test chamber 2202 may include any number of clamps, suction cups, through holes, or other attachment points, connectors or mechanisms. For example, the base 2210 and the test chamber 2202 may be configured to be mounted in an industrial rack of any size and configuration. The size of the test chamber 2202 may vary between the largest network devices, such as flat screen televisions, gaming devices, and high-definition set-top boxes to the smallest mobile devices that may require wireless testing.

The test chamber 2202 may also include any number of panels, supports, or structural components, such as sides 2216, top 2218, back 2220, and bottom (not shown). The cover 2206 may include infrared (IR) emitters 2224, 2226, and 2228 (jointly "2229"). In one embodiment, the IR emitters 2229 may represent infrared emitters in various positions for testing the network device 2208. The positioning of the IR emitters 2229 allows each network device 2208 to be tested utilizing one or more of the IR emitters 2229 corresponding to the IR receiver of the network device 2208. As a result, infrared testing may be performed on the network device 2208 without opening the cover 2206. In another embodiment, the IR emitters 2229 may represent windows, slots, slides, knock-outs, or tabs that may be opened for utilizing external infrared testing equipment, such as external emitters or transceivers. The IR emitters 2229 may also represent direction, omnidirectional The test chamber 2202 may further include a control bar 2239 may be utilized to open and close the cover 2206. For example, the control bar 2230 may be utilized as a handle for the user to rollback or close the cover 2206. In one embodiment, the control bar 2230 may rest on the handle 2204. As a result, the handle 2204 raises the control bar 2230 and the cover 2206 when the handle 2204 is raised. The control bar 2230 may allow the cover 2206 to be opened and closed even when the handle 2204 is in the closed door locked position as shown in FIG. 26.

In the open position shown by FIG. 27, the network device 2208 may be easily accessed. The control handle 2230 may further include grips 2232 for raising and lowering the control handle 2230 and corresponding cover 2206. In one embodiment, the cover 2206 may be raised even when the handle 2204 is in the race door unlocked position.

Turning now to FIGS. 28-31 showing pictorial representations of another RF isolation chamber 2800 in accordance with an illustrative embodiment. The RF isolation chamber 2800 may include any number of components. In one embodiment, the RF isolation chamber 2800 may include a base 2802, sides 2804 and 2806, back 2808, top 2810, and sliding cover 2812. The sliding cover 2812 may include slats 2814, windows 2816, and handle 2818.

The RF isolation chamber 2800 may be configured to test wireless devices, tablets, laptops, or other computing, communications, or media devices. The electronic devices may be positioned within the RF isolation chamber 2800 by the user. In one embodiment, the RF isolation chamber is configured as a stand-alone device for isolating electronic devices.

The RF isolation chamber 2800 may also be integrated with one or more testing systems or utilized as a stand-alone device. For example, any number of test devices or systems may be connected to or interfaced with an electronic device within the RF isolation chamber 2800. In one embodiment, the RF isolation chamber 2800 may include one or more ports for connecting communications cables, power supplies, interfaces, or other components that may be required to test an electronic device within the RF isolation chamber 2800. The ports may include flexible blockers (e.g., doors, tabs, screens, etc.) and configured to prevent RF leakage through the ports.

All or portions of the RF isolation chamber 2800 may be formed of absorbing and reflective materials that attenuate or completely block external wireless signals from entering the RF isolation chamber 2800 and internal wireless signals from exiting the RF isolation chamber 2800. In one embodiment, the base 2802, sides 2804 and 2806, back 2808, top 2810, and sliding cover 2812 may be formed from one or more aluminum panels or sections. The base 2802, sides 2804 and 2806, and back 2808 may also be referred to as walls. The aluminum panels may have a tongue and groove interconnection to eliminate internal cross talk between sections in the RF isolation chamber 2800 or adjacent RF isolation chambers. The panels may be molded together or attached utilizing screws, adhesives, rivets, hinges, an interference fit, or any number of other connectors. For example, the RF isolation chamber 2800 may include materials, such as foam, plastic, mesh, cloth, polymers, dielectrics, and so forth. The RF isolation chamber 2800 may include materials that are layered, laminated, adhered, molded, or otherwise attached to perform RF absorption and blocking. For example, a first layer of an absorbent material may be layered on a second layer of a reflective material. In one embodiment, all or portions of the interior of the RF isolation chamber 2800 are covered with one or more types of isolation mesh. For example, the isolation mesh may have an attenuation up to 6 GHz.

In one embodiment, the RF isolation chamber may be formed of two different types of meshes. For example, an outer layer may be a reflective mesh layer and the inner layer may be an absorbing layer utilized to provide greater attenuation. The outer layer may reflect signals that bombard the RF isolation chamber 2800 from the outside while the internal layer may absorb the RF energy inside the RF isolation chamber 2800 rather than allow the signals to reflect within RF isolation chamber 2800 causing reflective fading or ghost signal paths to the electronic device being tested.

In one embodiment, the RF isolation chamber 2800 may include one or more dual band antennas allowing for the use of multiple band access points to be utilized within the RF isolation chamber 2800 without reconfiguring the test components and cabling into the RF isolation chamber 2800. For example, to omnidirectional blade antennas for WiFi (e.g., a/b/g/n) covering both 2.4 GHz to 5 GHz bands may be utilized within the RF isolation chamber 2800. However, antennas configured to communicate utilizing any number of frequencies, standards, or protocols may be implemented.

In one embodiment, the RF isolation chamber 2800 may include the sliding cover 2812. The sliding cover 2812 may be a user-friendly roll top cover for easy access when opening or closing the RF isolation chamber 2800. The sliding cover 2812 may be mounted within rails that guide and constrain the motion of the sliding cover 2812. The sliding cover 2812 may also be attached via guides and slots defined within the sides 2804 and 2806. The rails may include a low friction surface or components, such as wheels, sliders, bearings, or so forth. For example, the sliding cover 2812 may include the handle 2818 allows a user to easily open and close the RF isolation chamber 2800. In one embodiment, the handle 2818 may include a latch or locking mechanism for closing during testing. The locking mechanism may also be utilized to lock the sliding cover 2812 in an open position. For example, the locking mechanism may include a handle and rods that extend into the sides 2804 and 2806. In other embodiments, the handle 2818 may be positioned for opening or accessing the RF isolation chamber 2800 at any time. In one embodiment, the RF isolation chamber 2800 may include any number of rails, test beds, ports, anchors, threaded receptacles, connectors, or so forth for securing test equipment or devices to the base 2802, sides 2804 and 2806, back 2808, top 2810, or sliding cover 2812 from the inside.

In one embodiment, the RF isolation chamber 2800 may be configured to receive wireless signals for testing the electronic device in isolation. For example, the RF isolation chamber 2800 may include one or more unshielded sections, ports, openings, or pass throughs for communicating wireless signals to the electronic device. For example, an infrared remote control may be used external to the RF isolation chamber 2800 to test a set top box within the RF isolation chamber 2800. In another example, a Wi-Fi and Bluetooth antenna may be utilized to communicate with a cell phone within the RF isolation chamber 2800 to determine wireless capabilities.

In one embodiment, the RF isolation chamber 2800 may include a number of isolated sections, divisions, or chambers for separately testing distinct devices. Each of the sections may include distinct test equipment, such as power, communications connections, and RF inputs/outputs. For example, the RF isolation chamber 2800 may include 2-8 chambers.

The windows 2816 may allow the user to view the electronic device being tested during the process. The windows 2816 may be covered with one or more layers of mesh or signal filters that allow the electronic device to be viewed while still performing wireless isolation. For example, the user may be able to verify functionality of various features of the electronic device (e.g., play, download, reset, power on, power off, change channel, record, stop, delete, etc.) without having an internal camera. However, a wired camera may be utilized to communicate a signal to a user/operator to verify functionality of the electronic device. The windows 2816 may alternatively represent doors that may be opened. The RF isolation chamber 2800 may isolate the electronic devices to −80 dbM allowing for adjustment and calibration to output signals generated by the electronic devices.

The previous detailed description is of a small number of embodiments for implementing the invention and is not intended to be limiting in scope. The following claims set forth a number of the embodiments of the invention disclosed with greater particularity.

What is claimed:

1. A testing station for testing wireless network devices, comprising:
   a control system configured to control parallel testing of the wireless network devices;
   a plurality of computing devices in communication with the control system, the plurality of computing devices are configured to perform testing of each of the wireless network devices in response to commands from the control system; and
   a plurality of testing chambers configured to isolate the wireless network devices from outside radio frequency signals, wherein the plurality of testing chambers are located on nested platforms of the testing station, and wherein each of the plurality of testing chambers include a retractable cover for inserting and removing each of the wireless network devices, the retractable cover comprising a plurality of slats that are rotationally attached to each other by a hinge.

2. The testing station according to claim 1, further comprising:
   adapters within each of the plurality of testing chambers and in communication with the plurality of computing devices for communicating with each of the wireless network devices.

3. The testing station according to claim 2, wherein the adapters physically connect to each of the wireless network devices.

4. The testing station according to claim 2, wherein the adapters communicate with each of the wireless network devices through a wireless connection.

5. The testing station according to claim 1, wherein the plurality of testing chambers include at least an absorption layer and a reflective layer.

6. The testing station according to claim 1, further comprising:
   one or more peripherals in communication with the control system for receiving input from a user; and
   a display in communication with the control system for displaying test information for each of the wireless network devices.

7. The testing station according to claim 1, further comprising sliding arms configured to enable a sliding movement of at least a portion of the nested platforms.

8. The testing station according to claim 1, wherein the plurality of testing chambers include a window for viewing testing of the wireless network devices through layers that block radio frequency signals.

9. The testing station according to claim 1, further comprising:
   a port for receiving a power supply associated with one of the wireless network devices, wherein the power supply is also tested by the testing station.

10. The testing station according to claim 1, wherein the plurality of test chambers include windows for performing at least infrared testing of the wireless network devices.

11. A method for testing a plurality of wireless network devices, comprising:
    opening a retractable cover for providing inside access to one of a plurality of test chambers, the retractable cover comprising a plurality of slats that are rotationally attached to each other by a hinge;
    inserting each the plurality of wireless network devices in one of the plurality of test chambers located on a plurality of nested platforms of a test fixture, each of the plurality of test chambers being controlled by one of a plurality of computing devices, and wherein the plurality of test chambers are configured to block radio frequency signals from entering or leaving the plurality of test chambers;
    engaging each of the plurality of wireless network devices in a test slot associated with the plurality of test chambers;
    closing the retractable cover of the one of the plurality of test chambers after engaging each of the plurality of wireless network devices in the test slot associated with the plurality of test chambers;
    automatically testing the plurality of wireless network devices in parallel in response to instructions received by the plurality of computing devices from a controller;
    measuring tests results for each of the plurality of wireless network devices; and
    displaying the test results for each of the plurality of wireless network devices to a user.

12. The method according to claim 11, wherein the testing slots includes an adapter for physically interfacing the one of the plurality of wireless network devices with the test fixture, and wherein the adapter is connected to a testing platform according to a type of the plurality of wireless network devices.

13. The method according to claim 11, wherein the testing slots each include a wireless interface for communicating with each of the plurality of wireless network devices isolated in each of the plurality of test chambers.

14. The method according to claim 11, further comprising:
    displaying a status of each of a plurality of tests for each of the plurality of wireless network devices utilizing a display in communication with the test fixture; and
    storing the test results associated with each of the plurality of wireless network devices in one or more databases.

15. The method according to claim 11, wherein automatically testing includes performing wired and wireless testing of the wireless network device and testing a power supply associated with one of the plurality of wireless network devices.

16. The method according to claim 11, wherein each of the plurality of test chambers includes radio frequency test equipment.

17. A testing station for testing wireless network devices, comprising:
    a control system configured to control parallel testing of the wireless network devices;
    a plurality of computing devices in communication with the control system, the plurality of computing devices are configured to perform testing of each of the wireless network devices in response to commands from the control system; and a plurality of testing chambers located on a plurality of nested platforms of the testing station configured to isolate the wireless network devices from outside radio frequency signals, wherein each of the plurality of testing chambers include a slidable cover for inserting and removing each of the wireless network devices, and wherein the slidable cover comprises a plurality of slats that are rotationally attached to each other by a hinge.

18. The testing station according to claim 17, further comprising:

adapters within each of the plurality of testing chambers and in communication with the plurality of computing devices for communicating with each of the wireless network devices.

19. The testing station according to claim 18, wherein each of the adapters include a port for connecting to a power supply associated with one of the wireless network devices, and wherein the power supply is tested during testing of the wireless network devices.

20. The testing station according to claim 17, wherein the slidable cover includes a lock for locking the slidable cover in an opened or closed position.

21. The testing station according to claim 17, wherein each of the plurality of test chambers includes radio frequency test equipment for communicating with each of the wireless network devices.

\* \* \* \* \*